US010822561B2

(12) United States Patent
Fan et al.

(10) Patent No.: US 10,822,561 B2
(45) Date of Patent: Nov. 3, 2020

(54) METHOD FOR PRODUCING A CLEAN GASOLINE AND A SYSTEM FOR PRODUCING THE SAME

(71) Applicant: China University of Petroleum-Beijing, Beijing (CN)

(72) Inventors: Yu Fan, Beijing (CN); Shihua Wang, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 98 days.

(21) Appl. No.: 15/885,686

(22) Filed: Jan. 31, 2018

(65) Prior Publication Data
US 2018/0312770 A1 Nov. 1, 2018

(30) Foreign Application Priority Data
Apr. 27, 2017 (CN) .......................... 2017 1 02858167

(51) Int. Cl.
*C10L 1/02* (2006.01)
*C10G 67/14* (2006.01)
(Continued)

(52) U.S. Cl.
CPC ............. *C10L 1/023* (2013.01); *B01J 19/245* (2013.01); *C10G 7/08* (2013.01); *C10G 21/00* (2013.01);
(Continued)

(58) Field of Classification Search
CPC combination set(s) only.
See application file for complete search history.

(56) References Cited

U.S. PATENT DOCUMENTS 3,350,415 A * 10/1967 Binning .................. B01D 3/40
549/532
4,375,361 A * 3/1983 Lyons ...................... B01J 31/04
44/310
(Continued)

FOREIGN PATENT DOCUMENTS

CN 101173184 A 5/2005
CN 101307254 A 11/2008
(Continued)

OTHER PUBLICATIONS

GB Application No. GB1802794.6, GB Search Report dated Jul. 18, 2018.
First Office Action and Search Report dated Nov. 28, 2018 for counterpart Chinese patent application No. 2018112301856350.

*Primary Examiner* — Ellen M McAvoy
*Assistant Examiner* — Chantel L Graham
(74) *Attorney, Agent, or Firm* — Loza & Loza, LLP; Michael F. Fedrick

(57) ABSTRACT

The present disclosure provides a method for producing a clean gasoline and a system for producing the same, the method includes: a full range gasoline is subjected to a directional sulfur transfer reaction, then is cut to obtain a light gasoline fraction, a medium gasoline fraction and a heavy gasoline fraction; the light gasoline fraction is treated to obtain an esterified light gasoline; the medium gasoline fraction is treated to obtain a raffinate oil and an extracted oil; the raffinate oil is treated to obtain an esterified medium gasoline; the heavy gasoline fraction is mixed with the extracted oil to obtain a mixed oil, and a one-stage hydrodesulfurization reaction, a two-stage hydrodesulfurization reaction, $H_2S$-removal and a hydrocarbon isomerization/aromatization reaction are carried out successively to obtain a treated heavy gasoline; blending the esterified light gasoline,
(Continued)

the esterified medium gasoline and the treated heavy gasoline to obtain a clean gasoline.

15 Claims, 6 Drawing Sheets

(51) Int. Cl.
*B01J 19/24* (2006.01)
*C10G 7/08* (2006.01)
*C10G 67/04* (2006.01)
*C10G 21/00* (2006.01)
*C10G 45/12* (2006.01)

(52) U.S. Cl.
CPC ............. *C10G 45/12* (2013.01); *C10G 67/04* (2013.01); *C10G 67/14* (2013.01); *B01J 2219/24* (2013.01); *C10G 2300/104* (2013.01); *C10G 2300/1037* (2013.01); *C10G 2300/1044* (2013.01); *C10G 2300/202* (2013.01); *C10G 2400/02* (2013.01); *C10L 2200/0423* (2013.01); *C10L 2270/023* (2013.01); *C10L 2290/24* (2013.01); *C10L 2290/543* (2013.01)

(56) References Cited

U.S. PATENT DOCUMENTS

| | | | | |
|---|---|---|---|---|
| 2007/0131420 A1* | 6/2007 | Mo | ................. | C10G 1/002 |
| | | | | 166/267 |
| 2010/0236979 A1* | 9/2010 | Fan | ................. | C10G 45/08 |
| | | | | 208/60 |
| 2014/0114104 A1* | 4/2014 | Caranoni | ............. | C10G 9/26 |
| | | | | 585/303 |

FOREIGN PATENT DOCUMENTS

| | | | |
|---|---|---|---|
| CN | 101418234 | | 4/2009 |
| CN | 101508912 | | 8/2009 |
| CN | 101885983 | | 11/2010 |
| CN | 101492608 B | * | 1/2013 |
| CN | 103074107 | | 5/2013 |
| CN | 104673377 | | 6/2015 |
| CN | 106520192 A | | 3/2017 |
| CN | 107151563 | | 9/2017 |
| CN | 107151564 | | 9/2017 |
| CN | 107488464 | | 12/2017 |
| CN | 107488465 | | 12/2017 |

* cited by examiner

US 10,822,561 B2

METHOD FOR PRODUCING A CLEAN GASOLINE AND A SYSTEM FOR PRODUCING THE SAME

CROSS-REFERENCE TO RELATED APPLICATION

This application claims priority to Chinese Patent Application No. 2017102858167, filed on Apr. 27, 2017, which is hereby incorporated by reference in its entirety.

TECHNICAL FIELD

The present invention relates to a method for producing a clean gasoline and a system for producing the same.

BACKGROUND

Note that the points discussed below are not necessarily admitted to be prior art.

In the increasingly trends of global environmental regulations becoming more and more stringent, countries around the world are beginning to strengthen the gasoline product quality standards. Since Jan. 1, 2017, National V standard gasoline has been supplied nationwide. For National V gasoline standard, the sulfur content of gasoline is ≤10 mg/Kg, and olefin content is ≤24 v %. For the new coming National VI gasoline standard, the sulfur content is maintained ≤10 mg/Kg, and the olefin content is reduced to 18 v % and 15 v % in different stages, which makes the gasoline refining industry face severe challenges in China. The majority (more than 70%) of China's automotive gasoline is the catalytic cracking gasoline, and China's catalytic cracking gasoline is characterized by high sulfur and high olefin. In the process of desulfurization and olefin reduction, the saturation process of olefins will cause serious loss of gasoline octane value. It is of practical significance to develop a method for producing a clean gasoline that can maintain or increase the octane value of gasoline upon ultra-deep desulfurization and significant olefins reduction.

For the production of ultra-clean high-octane gasoline, many attempts have been made to achieve desulfurization and olefin reduction of gasoline, while increasing or improving its octane value by different means. However, the development of a gasoline producing method for ultra-deep desulfurization and substantial olefin reduction, while significantly improving the gasoline octane value, is still the pursuit of researchers.

SUMMARY

In one aspect, the present disclosure provides a method for producing a clean gasoline, comprising the steps of:

allowing the full range (whole fraction) gasoline to be contacted with a sulfur-transfer catalyst under the condition of hydrogen and undergo a directional sulfur transfer reaction, and then cutting the gasoline to obtain a light gasoline fraction, a medium gasoline fraction and a heavy gasoline fraction;

mixing the light gasoline fraction with acetic acid, wherein the olefins in the light gasoline fraction are subjected to an esterification reaction under the action of a light gasoline esterification catalyst, and removing the unreacted acetic acid to obtain an esterified light gasoline;

obtaining an olefins-rich raffinate oil and an sulfide and aromatics-rich extracted oil by separating the medium gasoline fraction by passing through an extractive distillation system;

mixing the raffinate oil with formic acid, wherein an esterification reaction (raffinate oil esterification reaction) of the olefins in the raffinate oil is carried out under the action of a medium gasoline esterification catalyst, and then the unreacted formic acid is removed to obtain an esterified medium gasoline;

mixing the heavy gasoline fraction with the extracted oil to obtain a mixed gasoline, which is successively subjected to an one-stage hydrodesulfurization reaction, a two-stage hydrodesulfurization reaction and $H_2S$-removal and hydrocarbon isomerization/aromatization reaction to obtain treated heavy gasoline;

the one-stage hydrodesulfurization reaction occurs under the condition of the mixed gasoline is contacted with a one-stage selective hydrodesulfurization catalyst to remove macromolecular sulfides;

the two-stage hydrodesulfurization reaction occurs under the condition of the product of one-stage hydrodesulfurization reaction in contacted with a two-stage selective hydrodesulfurization catalyst to remove small molecular sulfides;

the hydrocarbon isomerization/aromatization reaction occurs under the condition of after the product of $H_2S$-removal is contacted with a hydrocarbon isomerization/aromatization catalyst; and re-blending the esterified light gasoline, the esterified medium gasoline and the treated heavy gasoline to obtain the clean gasoline.

In another aspect, the present disclosure provides a producing system for a clean gasoline which can be applied to the aforementioned production method.

Figure 1:
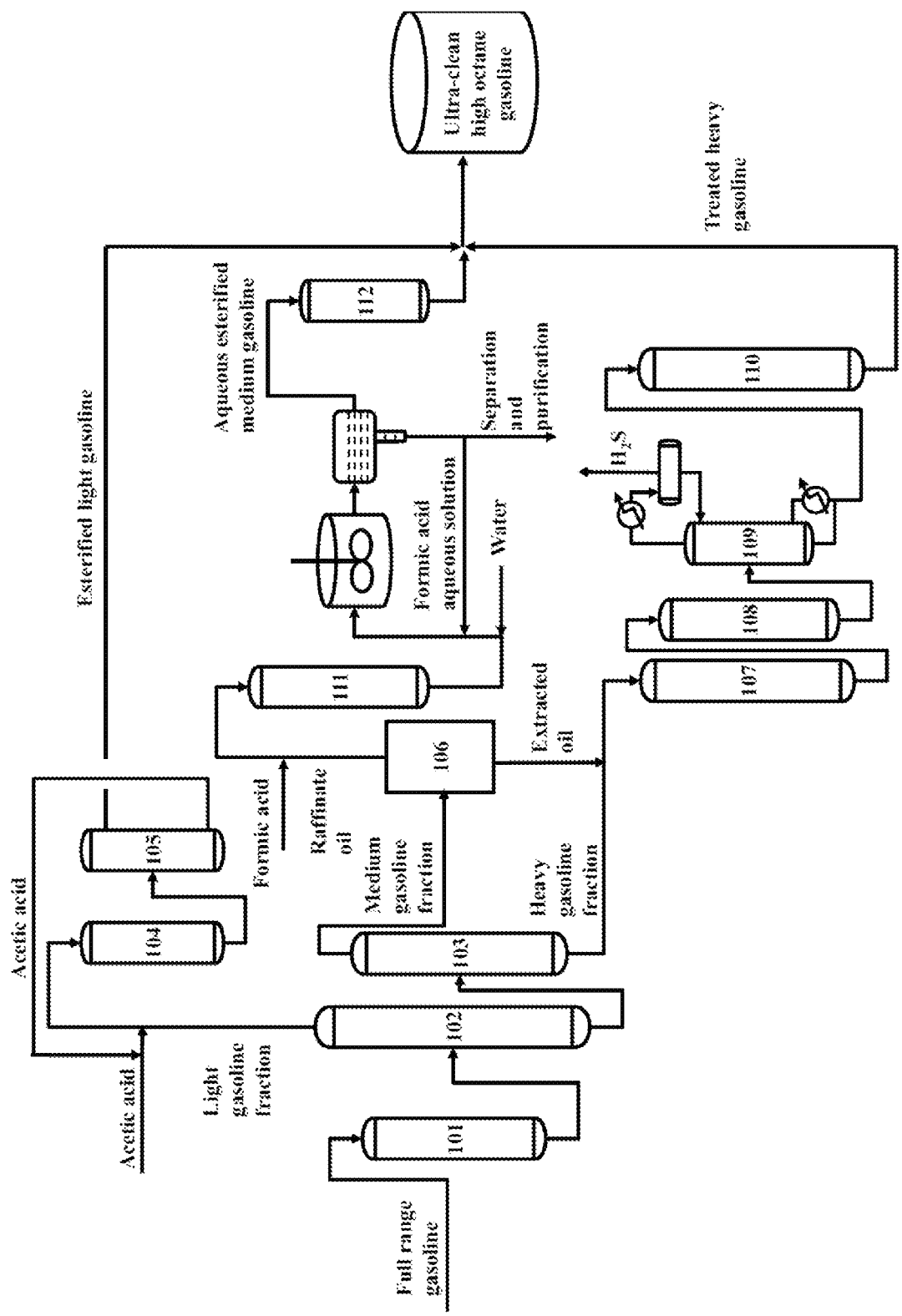
FIG. 1 is a schematic flow diagram and a system of a method for producing an ultra-clean high-octane gasoline provided in Example 1 of the present disclosure.

The reference numbers in the figures have the following meaning:

101: directional sulfur transfer reactor; 102: light gasoline cutting column; 103: heavy component cutting column; 104: light gasoline esterification reactor; 105: acetic acid rectification separation system; 106: extractive distillation system; 107: one-stage hydrodesulfurization reactor; 108: two-stage hydrodesulfurization reactor; 109: stripping column; 110: hydrocarbon isomerization/aromatization reactor; 111: medium gasoline esterification reactor; 112: coalescence dehydrator; 113: debenzolization column; 201: first rectifying column; 202: second rectifying column; 203: third rectifying column; 204: fourth rectifying column; 301:

extractive distillation column; 302: desulfurization column; 303: regeneration column; 304: coalescence dehydrator.

DESCRIPTION OF EMBODIMENTS

The technical solutions of the present disclosure will now be described in detail in order to provide a clearer understanding of the technical features, objects and advantages of the present disclosure, but are not to be interpreted as limiting the scope of the disclosure.

In one aspect, the present disclosure provides a method for producing a clean gasoline, comprising the steps of:

allowing the full range (whole fraction) gasoline to be contacted with a sulfur-transfer catalyst under the condition of hydrogen and undergo a directional sulfur transfer reaction, and then cutting the gasoline to obtain a light gasoline fraction, a medium gasoline fraction and a heavy gasoline fraction, in which the gasoline is preferable cut into the light gasoline fraction and the heavy component firstly, and then the heavy component is cut into a medium gasoline fraction and a heavy gasoline fraction;

mixing the light gasoline fraction with acetic acid, wherein the olefins in the light gasoline fraction are subjected to an esterification reaction (a light gasoline esterification reaction) under the action of a light gasoline esterification catalyst, and removing the unreacted acetic acid (preferably, removing the unreacted acetic acid by the acetic acid rectification separation system) to obtain an esterified light gasoline;

obtaining an olefins-rich raffinate oil and an sulfide and aromatics-rich extracted oil by separating the medium gasoline fraction by passing through an extractive distillation system;

mixing the raffinate oil with formic acid, wherein an esterification reaction (raffinate oil esterification reaction) of the olefins in the raffinate oil is carried out under the action of a medium gasoline esterification catalyst, and then the unreacted formic acid is removed to obtain an esterified medium gasoline;

mixing the heavy gasoline fraction with the extracted oil to obtain a mixed gasoline, which is successively subjected to an the one-stage hydrodesulfurization reaction, the two-stage hydrodesulfurization reaction and $H_2S$-removal (it is preferable to feed the two-stage desulfurized mixed gasoline into the stripping column to separate the $H_2S$ generated during the hydrodesulfurization process) and hydrocarbon isomerization/aromatization reaction to obtain treated heavy gasoline;

wherein the one-stage hydrodesulfurization reaction occurs under the condition of the mixed gasoline is contacted with a one-stage selective hydrodesulfurization catalyst to remove macromolecular sulfides;

wherein the two-stage hydrodesulfurization reaction occurs under the condition of the product of one-stage hydrodesulfurization reaction in contacted with a two-stage selective hydrodesulfurization catalyst to remove small molecular sulfides;

wherein the hydrocarbon isomerization/aromatization reaction occurs under the condition of after the product of $H_2S$-removal is contacted with a hydrocarbon isomerization/aromatization catalyst; and re-blending the esterified light gasoline, the esterified medium gasoline and the treated heavy gasoline to obtain the clean gasoline.

This method is suitable for the modification of inferior gasoline, especially for high sulfur, high olefin catalytic cracking (fluid catalytic cracking) gasoline, which can maintain or increase the octane value of gasoline while ultra-deep desulfurization.

Preferably, the full range gasoline is a full range FCC gasoline having a sulfur content of 300 to 2000 $\mu g \cdot g^{-1}$, and an olefin content of 25 to 50 v %.

More preferably, the gasoline has a sulfur content of 500 to 2000 $\mu g \cdot g^{-1}$, such as 500, 1000, 1500, 2000 $\mu g \cdot g^{-1}$ etc.

More preferably, the gasoline has an olefin content of 30 to 50 v %, such as 30%, 35%, 40%, 45%, 50% etc. The present disclosure provides another method for producing clean gasoline which is substantially the same as the producing method described above except that the raffinate oil is not subjected to an esterification reaction, but the raffinate oil is mixed with the product after $H_2S$ removal to carry out the hydrocarbon isomerization/aromatization reaction.

In either of the above methods, optionally, the extracted oil is subjected to a debenzolization treatment before mixing with the heavy gasoline fraction. Preferably, the debenzolization treatment is carried out when the benzene content of the full range gasoline is greater than 0.8 v %. That is, the extracted oil is subjected to debenzolization treatment first, and then mixed with the heavy gasoline fraction to obtain a mixed oil which is then subjected to the one-stage hydrodesulfurization reaction, a two-stage hydrodesulfurization reaction, $H_2S$-removal and the hydrocarbon isomerization/aromatization reaction.

As a method of a debenzolization treatment, it is possible to carry out the debenzolization treatment of the extracted oil using a debenzolization distillation system. Preferably, the debenzolization distillation system comprises a debenzolization column having a number of column plates of 20 to 50, a number of feed plates of 10 to 40; a column top temperature is controlled to be 90 to 120° C., a column top pressure to be 0.7 to 1.5 atm, a column kettle temperature to be 120 to 160° C., a column kettle pressure to be 1.3 to 1.7 atm, and a reflux ratio to be 1.5 to 2.5 during the debenzolization treatment.

In either of the above producing methods, it is preferable that the reaction conditions of the directional sulfur transfer reaction are: a reaction pressure of 1.0 to 3.0 MPa, a liquid volume space velocity of 2.0 to 8.0 $h^{-1}$, a reaction temperature of 100 to 200° C., a hydrogen/oil volume ratio 4 to 50.

In either of the above producing methods, it is preferable that the sulfur transfer catalyst comprises: 2 to 30 wt. % of the transition metal oxides, 0.5 to 6 wt. % of the promoters (adjuvants), 10 to 40 wt. % of the zeolites, the balance being inorganic refractory oxides, based on 100% of the total weight of the sulfur transfer catalyst.

The transition metal oxides may comprise one or more of NiO, CoO, ZnO, $MoO_3$, $WO_3$, CuO and the like.

The promoters may comprise one or more of $K_2O$, MgO, $La_2O_3$ and the like.

The inorganic refractory oxides may comprise one or more of alumina, silica, silicon-containing alumina and the like.

The zeolites can be a HZSM-5 zeolite with hierarchically arranged pores. Preferably, the synthetic process of the HZSM-5 zeolite with hierarchically pores comprises: dissolving NaOH in deionized water at 50 to 70° C., stirring and mixing uniformly, adding $Al_2(SO_4)_3 \cdot 18H_2O$, TPABr (tetrapropylammonium bromide) and TEOS (tetraethyl orthosilicate) and mixing uniformly in order to obtain a starting sol; and the molar ratio of the raw material of the starting sol is: NaOH:TEOS=0.025 to 0.75:1, deionized water:TEOS=25 to 125:1, TPABr:$Al_2(SO_4)_3 \cdot 18H_2O$=8 to 72:1, TEOS:$Al_2(SO_4)_3 \cdot 18H_2O$=40 to 300:1; adding the polyquaternium salt PCD (the polymerization degree n=16 and the molecular weight=8000) to the above starting sol and stirring uniformly, the molar ratio of the polyquaternium salt PCD to the $Al_2(SO_4)_3 \cdot 18H_2O$ being 0.12 to 0.54:1; and then aged for 12 to 48 h, and crystallization at 150 to 180° C. for 24 to 96 h; filtered and washed, then dried at 100 to 150° C. for 8 to 24 h, to obtain the ZSM-5 zeolite with hierarchically pores composite containing template agent; the ZSM-5 zeolite with hierarchically pores composite containing template agent is calcined at 550 to 650° C. 4 to 8 h to remove the template agent and obtain a ZSM-5 zeolite with cascade pores composite without template agent; the above ZSM-5 zeolite with hierarchically pores composite is subjected to ammonium exchange treatment, 1 to 3 mol/L of $NH_4Cl$ solution can be used, the ammonium exchange treatment is performed with the mass ratio of $NH_4Cl$ solution:composite (liquid-solid) being 10:1, the treatment temperature is 50 to 100° C., and the ammonium exchange treatment is performed twice, after each ammonium exchange treatment completed, the resulting products were dried at 100 to 150° C. for 4 to 8 h, calcined at 400 to 600° C. for 3 to 10 h, to obtain HZSM-5 zeolite with hierarchically pores composite.

In either of the above producing methods, it is preferable that the cutting temperature between the light gasoline fraction and the medium gasoline fraction is any point in the range of 30 to 60° C., the cutting temperature between the medium gasoline fraction and the heavy gasoline fraction is higher than any point in the range of 60 to 150° C. For example, the cutting temperature between the light gasoline fraction and the medium gasoline fraction is 50° C., the cutting temperature between the medium gasoline fraction and the heavy gasoline fraction is 120° C., that is, the fraction obtained at a temperature of not more than 50° C. is the light gasoline fraction, the fraction obtained at a temperature of more than 50° C. to 120° C. is the medium gasoline fraction, the fraction obtained at a temperature of more than 120° C. is the heavy gasoline fraction.

In either of the above producing methods, it is preferable that the esterification reaction conditions of the light gasoline are: the reaction temperature is 80 to 200° C., the reaction pressure is 0.1 to 6.0 MPa, the weight ratio of acetic acid to the olefin in the light gasoline fraction (acid olefin ratio) is 0.5 to 2.5:1.0, the liquid volume space velocity is 0.5 to 5.0 $h^{-1}$ based on the acetic acid.

The process of above light gasoline esterification reaction may include: mixing the light gasoline fraction with acetic acid in certain ratio, the esterification reaction is performed by at least one (i.e., one or more series or parallel) fixed bed reactor loaded with a light gasoline esterification catalyst to obtain an esterified light gasoline. After the esterification reaction, the unreacted acetic acid is removed from the esterified light gasoline by the rectification separation system to obtain the esterified light gasoline.

In either of the above producing methods, it is preferable that the light gasoline esterification catalyst or the medium gasoline esterification catalyst is the esterification catalyst having a high secondary-ester selectivity, including one or more of a metal oxide catalyst, a zeolite molecular sieve catalyst, a $SO_4^{2-}/M_xO_y$ catalyst, a strong acid cation exchange resin catalyst, and the like, and in $M_xO_y$, x is 1 to 5, y is 1 to 8.

It is preferable that the metal oxide catalyst comprises a catalyst made of at least one of silica, molecular sieve and diatomite, and the like as a carrier loaded with at least one metal oxide such as ZnO, SnO and $Al_2O_3$, and the like. The carrier may have a microporous structure or a mesoporous structure.

It is preferable that the zeolite molecular sieve catalyst comprises a molecular sieve catalyst mixture of one or more of an aluminum phosphate molecular sieve, a silicoaluminophosphate molecular sieve, a H-type mordenite, a HY zeolite, a H-β zeolite, a HZSM-5 zeolite and silicon-containing alumina, and the like. The zeolite molecular sieve may be a zeolite with micropores molecular sieve or a zeolite with hierarchically pores molecular sieve.

It is preferable that the $SO_4^{2-}/M_xO_y$ catalyst include a $SO_4^{2-}/M_xO_y$ catalyst prepared by loading $SO_4^{2-}$ onto a carrier made of at least one metal oxide such as ZrO, ZnO and SnO.

It is preferable that the strong acid cation exchange resin catalyst includes a mesoporous-macroporous high molecular cross-linked polymer catalyst comprising a strong acid reactive group. For example, the strong acid reactive group is sulfonic acid group-$SO_3H$, and the like.

In either of the above producing methods, it is preferable that the unreacted acetic acid is removed by an acetic acid rectification separation system; further preferably, the acetic acid rectification separation system comprises at least two rectifying columns; it is preferable that the rectification separation system comprises four rectifying columns, being a first rectifying column, a second rectifying column, a third rectifying column and a fourth rectifying column, respectively;

Preferably, the number of column plates of the first rectifying column is 20 to 50, the number of feed plates is 10 to 40, the operating conditions are controlled to be: the column top temperature is 20 to 50° C., the column top pressure is 1 to 5 atm, the column kettle temperature is 100 to 200° C., the column kettle pressure is 1 to 10 atm, the reflux ratio is 0.1 to 10.

Preferably, the number of column plates of the second rectifying column is 20 to 100, the number of feed plates is 10 to 80, the operating conditions are controlled to be: the column top temperature is 100 to 150° C., the column top pressure is 1 to 5 atm, the column kettle temperature is 100 to 200° C., the column kettle pressure is 1 to 5 atm, the reflux ratio is 1 to 40.

Preferably, the number of column plates of the third rectifying column is 20 to 70, the number of feed plates is 10 to 60, the operating conditions are controlled to be: the column top temperature is 50 to 150° C., the column top pressure is 1 to 5 atm, the column kettle temperature is 80 to 150° C., the column kettle pressure is 1 to 5 atm, the reflux ratio is 1 to 30.

Preferably, the number of column plates of the fourth rectifying column is 10 to 60, the number of feed plates is 10 to 50, the operating conditions are controlled to be: the column top temperature is 80 to 150° C., the column top pressure is 1 to 5 atm, the column kettle temperature is 100 to 150° C., the column kettle pressure is 1 to 5 atm, the reflux ratio is 1 to 30.

In either of the above producing methods, it is preferable that the extractive distillation system comprises an extractive distillation column, a desulfurization column, an extraction oil dehydrator and a regeneration column. The steps of obtaining the olefin-rich raffinate oil and the sulphide- and aromatic-rich extracted oil by passing through the extractive distillation system preferably includes:

the medium gasoline fraction enters the extractive distillation column, and being sufficiently contacted with the extraction solvent injected from the top of the extractive distillation column (extraction solvent dissolves the sulfide and the aromatics in the medium gasoline), the raffinate oil as the top product and the mixture of the extracted oil and the solvents as the bottom product are obtained by the rectification separation, a part of the raffinate oil as the top product is reflux, a part of the raffinate oil is used as the product of the step, and the mixture of the extracted oil and the solvents as the bottom product is sent into the desulfurization column for rectification;

a water vapor and a regenerated solvent from the regeneration column is introduced into the bottom of the desulfurization column, a mixture of the extracted oil and water as the top product, and the solvent as the bottom product are obtained by the rectification separation, the mixture of the extracted oil and water is layered to obtain a pre-dehydration extracted oil and water, a part of the pre-dehydration extracted oil is reflux, a part of the pre-dehydration extracted oil is dehydrated by a extraction oil dehydrator to obtain the extracted oil, the extracted oil is the product of this step, a part of the solvent obtained at the bottom is returned to the extractive distillation column being as the extraction solvent, a part of the solvent obtained is sent into the regeneration column for solvent regeneration; and a water vapor is introduced into the bottom of the regeneration column and used to strip the entering solvent to obtain water vapor and the regenerated solvent and the deactivated solvent (high boiling point cracked polycondensate), the water vapor and the regenerated solvent are discharged from the top of the regeneration column and returned to bottom of the desulfurization column, and the deactivated solvent is discharged from the bottom of the regeneration column.

In either of the above producing methods, it is preferable that the extraction solvent includes one or more from the group of diethylene glycol, triethylene glycol, tetraethylene glycol, dimethyl sulfoxide, sulfolane, N-formyl morpholine, N-methyl-pyrrolidone, polyethylene glycol, propylene carbonate and the like.

In either of the above producing methods, it is preferable that the number of column plates of the extractive distillation column is 50 to 100, the number of feed plates is 30 to 70, the operating conditions are controlled to be: the column top temperature is 60 to 110° C., the column top pressure is 0.1 to 1 atm, the column kettle temperature is 140 to 200° C., the column kettle pressure is 0.5 to 1.5 atm, the reflux ratio is 0.1 to 3, the mass ratio of the extraction solvent to the medium gasoline fraction is 1 to 10:1.

It is preferable that the number of column plates of the desulfurization column is 15 to 35, the number of feed plates is 1 to 20, the operating conditions are controlled to be: the column top temperature is 40 to 80° C., the column top pressure is −1 to 0 atm, the column kettle temperature is 140 to 200° C., the column kettle pressure is −1 to 0 atm, the reflux ratio is 0.1 to 3.

It is preferable that the extraction oil dehydrator is a coalescence dehydrator.

It is preferable that the column top temperature of the regeneration column is controlled to 100 to 200° C., the mass ratio of the introduced water vapor to the entering solvent is 0.5 to 5:1.

It is more preferable that satisfying one or more of the above preferred embodiments at the same time (for example, all) to obtain the raffinate oil and the extracted oil.

In either of the above producing methods, it is preferable that the step of "the olefin in the raffinate oil is subjected to an esterification reaction, and then the unreacted formic acid is removed to obtain an esterified medium gasoline" comprises the following steps:

mixing the raffinate oil with formic acid, and adding the mixture into the medium gasoline esterification reactor, and by contacting with a medium gasoline esterification catalyst, the olefins in the raffinate oil is esterified to obtain an esterified product; and removing the formic acid in the esterified product by an extraction operation and then the resultant being dehydrated to obtain an esterified medium gasoline; it is preferable that the esterified product is mixed with the formic acid extractant—water and/or formic acid aqueous solution (water in the formic acid extractant extract the unreacted formic acid in the esterified product), and the mixture is stirred and layered to obtain an aqueous esterified medium gasoline and formic acid aqueous solution extract, after dehydration of the aqueous esterified medium gasoline, the esterified medium gasoline is obtained.

According to the actual situation, a part of the resulting formic acid aqueous solution extract can be separated and purified, and the other part can be used directly as the formic acid extractant or as formic acid extractant after being mixed with water. It is preferable that when a separated and purified formic acid aqueous solution extract or a formic acid extractant is used, the mass ratio is 1:20 to 200.

In either of the above producing methods, it is preferable that the esterification reaction conditions of the raffinate oil are: the reaction temperature is 80 to 200° C., the reaction pressure is 0.1 to 6.0 MPa, the weight ratio of the formic acid to the olefin in the raffinate oil (acid/olefin ratio) is 0.5 to 2.5:1.0, the liquid volume space velocity is 0.5 to 5.0 $h^{-1}$ basing on formic acid.

It is preferable that the aqueous esterified medium gasoline is dehydrated by a coalescence dehydrator.

Above light gasoline esterification catalyst of the disclosure is suitable as the medium gasoline esterification catalyst. It is preferable that the preparation method and composition range of the medium gasoline esterification catalyst are the same as those of the light gasoline esterification catalyst.

In either of the above producing methods, the mixed oil obtained by mixing the heavy gasoline fraction and the extracted oil contacts in succession with an one-stage selective hydrodesulfurization catalyst and a two-stage selective hydrodesulfurization catalyst to undergo the one-stage hydrodesulfurization reaction and the two-stage hydrodesulfurization reaction respectively, and a one-stage hydrodesulfurization reactor and a two-stage hydrodesulfurization reactor are arranged in series; and then the resultant enters the stripping column, and $H_2S$ is separated; and then the resulting material contacts with a hydrocarbon isomerization/aromatization catalyst to undergo a hydrocarbon isomerization/aromatization reactions.

It is preferable that the conditions of the one-stage hydrodesulfurization reaction are: the reaction pressure is 1.0 to 3.0 MPa, the liquid volume space velocity is 3.0 to 6.0 $h^{-1}$, the reaction temperature is 200 to 300° C., and the hydrogen/oil volume ratio is 200 to 600.

It is preferable that the conditions of the two-stage hydrodesulfurization reaction are: the reaction pressure is 1.0 to 3.0 MPa, the liquid volume space velocity is 3.0 to 6.0 $h^{-1}$, the reaction temperature is 300 to 400° C., and the hydrogen/oil volume ratio is 200 to 600.

It is preferable that the bottom temperature of the stripping column is controlled to be 150 to 200° C., the column top temperature is 60 to 120° C., and the pressure is 0.1 to 2 MPa.

It is preferable that the reaction conditions of the hydrocarbon isomerization/aromatization reaction are: the reaction pressure is 1.0 to 3.0 MPa, the liquid volume space velocity is 1.0 to 4.0 $h^{-1}$, the reaction temperature is 340 to 430° C., and the hydrogen/oil volume ratio is 200 to 600.

It is more preferable that one or more (e.g., all) of the above preferable conditions are satisfied at the same time to obtain the treated heavy gasoline.

The selectivity in the one-stage selective hydrodesulfurization catalyst or the two-stage selective hydrodesulfurization catalyst of the present disclosure is to select a hydrodesulfurization reaction between hydrodesulfurization and olefin saturation.

In either of the above producing methods, it is preferable that the one-stage selective hydrodesulfurization catalyst comprises: $MoO_3$ 10 to 18 wt. %, CoO 2 to 6 wt. %, $K_2O$ 1 to 7 wt. %, $P_2O_5$ 2 to 6 wt. %, and the balance being Al—Si—Mg composite oxide carrier based on 100% of the total weight of the one-stage selective hydrodesulfurization catalyst, and the weight composition of the Al—Si—Mg composite oxide in the catalyst is: $Al_2O_3$ 60 to 75 wt. %, $SiO_2$ 5 to 15 wt. % and MgO 3 to 10 wt. %.

In either of the above producing methods, it is preferable that the two-stage selective hydrodesulfurization catalyst comprises: $MoO_3$ 3 to 10 wt. %, NiO 5 to 20 wt. %, $K_2O$ 1 to 7 wt. % and the balance being Al—Si composite oxide carrier based on 100% of the total weight of the two-stage selective hydrodesulfurization catalyst, and the weight composition of the Al—Si composite oxide in the catalyst is: $Al_2O_3$ 60 to 75 wt. %, $SiO_2$ 5 to 15 wt. %.

In either of the above producing methods, it is preferable that the hydrocarbon isomerization/aromatization catalyst comprises: $MoO_3$ 4 to 8 wt. %, CoO 1 to 4 wt. %, $P_2O_5$ 1 to 3 wt. %, modified HZSM-5 zeolite 50 to 70 wt. % and the balance being Al—Ti composite oxide binder based on 100% of the total weight of hydrocarbon isomerization/aromatization catalyst; the weight composition of the Al—Ti composite oxide binder in the catalyst is: $Al_2O_3$ 70 to 95 wt. %, $TiO_2$ 5 to 30 wt. %; and the modified HZSM-5 zeolite is a product of HZSM-5 zeolite treated by hydrothermal treatment and modified treatment of mixed acid solution of inorganic acids and organic acids.

It is preferable that either of the above producing method further comprises drying and pre-sulfurization of the directional sulfur transfer catalyst, the one-stage selective hydrodesulfurization catalyst, the two-stage selective hydrodesulfurization catalyst and the hydrocarbon isomerization/aromatization catalyst.

It is preferable that the drying conditions are: at 100 to 150° C., under $N_2$ atmosphere, with the $N_2$ space velocity being 200 to 2000 $h^{-1}$.

It is preferable that the pre-sulfurization steps are: completely replacing $N_2$ in the catalyst bed by $H_2$ and maintaining the space velocity of $H_2$ being 500 to 3000 $h^{-1}$, adjusting the temperature of the catalyst bed to 120 to 180° C., adding a straight-run naphtha to the catalyst bed in a volume space velocity of 1 to 5 $h^{-1}$, adjusting the hydrogen/oil volume ratio to 200 to 500:1; the catalyst bed is heated to 150 to 200° C. at a speed of 10 to 30° C./h, beginning to inject the vulcanizing agent (e.g., dimethyl disulfide), adjusting the injection rate to 1 to 5 wt. % of that of the straight-run naphtha; and continuing to heat to 210 to 250° C. at a speed of 10 to 30° C./h, and keeping the temperature for 6 to 10 h; heating to 270 to 290° C. at a speed of 10 to 30° C./h, and keeping the temperature for 6 to 10 h; heating to 310 to 350° C. at a speed of 10 to 30° C./h, and keeping the temperature for 6 to 10 h; and cooling the reaction temperature of each catalyst bed at a speed of 10 to 30° C./h; finally, the vulcanized oil in the system is replaced by an oil for reaction, and the vulcanization is ended.

In another aspect, the present disclosure provides a producing system for a clean gasoline which can be applied to the aforementioned producing method, the producing system comprises a directional sulfur transfer reactor, a light gasoline cutting column used for cutting in order to obtain the light gasoline fraction and the heavy components, a heavy component cutting column used for cutting in order to obtain the medium gasoline fraction and the heavy gasoline fraction, a light gasoline esterification reactor, a acetic acid rectification separation system for removal of acetic acid, an extractive distillation system used for separate the extracted oil and the raffinate oil, a medium gasoline esterification reactor, a formic acid extraction system, a medium gasoline dehydrator, an one-stage hydrodesulfurization reactor, a two-stage hydrodesulfurization reactor, a stripping column, and a hydrocarbon isomerization/aromatization reactor; wherein, the directional sulfur transfer reactor is provided with a feed inlet, a reactant outlet of the directional sulfur transfer reactor is connected with the feed inlet of the light gasoline cutting column through a pipeline, the light gasoline fraction outlet of the light gasoline cutting column is connected with the inlet of raw material of reaction of the light gasoline esterification reactor through a pipeline, the heavy component outlet of the light gasoline cutting column is connected with the feed inlet of the heavy component cutting column through a pipeline, the reactant outlet of the light gasoline esterification reactor is connected with the acetic acid rectification separation system through a pipeline, the medium gasoline fraction outlet of the heavy component cutting column is connected with the extractive distillation system through a pipeline, the raffinate oil outlet of the extractive distillation system is connected with the inlet of raw material of reaction of the medium gasoline esterification reactor through a pipeline, the reactant outlet of the medium gasoline esterification reactor is connected with the formic acid extraction system through a pipeline, the outlet of the formic acid extraction system is connected with the feed inlet the medium gasoline dehydrator through a pipeline, the heavy gasoline fraction outlet of the heavy component cutting column is connected with the feed inlet of the one-stage hydrodesulfurization reactor through a pipeline, the extracted oil outlet of the extractive distillation system is connected with the feed inlet of the one-stage hydrodesulfurization reactor through a pipeline, the one-stage hydrodesulfurization reactor, the two-stage hydrodesulfurization reactor, the stripping column and the hydrocarbon isomerization/aromatization reactor arrange in series with each other; the esterified light gasoline outlet of the acetic acid rectification separation system, the esterified medium gasoline outlet of the medium gasoline dehydrator and the treated heavy gasoline outlet of the hydrocarbon isomerization/aromatization reactor are each connected to a storage tank.

Alternatively, the raffinate oil outlet of the extractive distillation system is not connected with the inlet of raw material of reaction of the medium gasoline esterification reactor, but is directly connected with the inlet of raw material of reaction of the hydrocarbon isomerization/aromatization reactor through a pipeline. In the aforementioned producing system, the alternative system is without a medium gasoline esterification reactor, a formic acid extraction system and a medium gasoline dehydrator. Instead, the raffinate oil outlet of the extractive distillation system is directly connected with the inlet of raw material of reaction of the hydrocarbon isomerization/aromatization reactor through a pipeline, and the rest is the same as the aforementioned producing system.

Optionally, in any of the above embodiments of the producing system, a debenzolization column is provided on the pipeline between the extracted oil outlet of the extractive distillation system and the reaction feed inlet of the one-stage hydrodesulfurization reactor, the debenzolized and extracted oil outlet of the debenzolization column is connected with the one-stage hydrodesulfurization reactor.

In any of the above embodiments of the producing system, it is preferable that the medium gasoline dehydrator is a coalescence dehydrator.

In any of the above embodiments of the producing system, it is preferable that the extractive distillation system comprises an extractive distillation column, a desulfurization column, an extraction oil dehydrator and a regeneration column, on the top of the extractive distillation column is provided with an extraction solvent inlet, the feed inlet of the extractive distillation column is connected with the medium gasoline fraction outlet through a pipeline, the top of the extractive distillation column is provided with a raffinate oil outlet equipped with a reflux device, the bottom product outlet of the extractive distillation column is connected with the feed inlet of the desulfurization column through a pipeline, on the top of the desulfurization column is provided with a pre-dehydration extracted oil outlet and a reflux inlet equipped with a reflux device, the extraction oil dehydrator is provided with a pre-dehydration extracted oil inlet and a extracted oil outlet, the pre-dehydration extracted oil outlet on the top of the desulfurization column is connected with a reflux inlet on the top of the desulfurization column and a pre-dehydration extracted oil inlet of the extraction oil dehydrator respectively, the kettle of the desulfurization column is provided with a water vapor and solvent inlet, the bottom product outlet of the desulfurization column is connected with the extraction solvent inlet and the feed inlet of the regeneration column through a pipeline respectively, the kettle of the regeneration column is provided with a water vapor inlet, the top product outlet of the regeneration column is connected with the water vapor and the solvent inlet of the desulfurization column through a pipeline, the regeneration column is provided with a bottom product outlet.

It is preferable that the extraction oil dehydrator is a coalescence dehydrator.

In any of the above embodiments of the producing system, it is preferable that the acetic acid rectification separation system comprises a first rectifying column, a second rectifying column, a third rectifying column and a fourth rectifying column; wherein the feed inlet of the first rectifying column is connected with the reactant outlet of the light gasoline esterification reactor through a pipeline, the bottom product outlet of the first rectifying column is connected with the feed inlet of the second rectifying column through a pipeline, the top product outlet of the second rectifying column is connected with the feed inlet of the third rectifying column through a pipeline, the feed inlet of the third rectifying column is also connected with a water pipeline, the top product outlet of the third rectifying column is connected with a demixer through a pipeline, the demixer is provided with an oil outlet and a water outlet, the water outlet is connected with the feed inlet of the third rectifying column through a pipeline, the bottom product outlet of the third rectifying column is connected with the feed inlet of the fourth rectifying column through a pipeline, the top product outlet of the fourth rectifying column is connected with the feed inlet of the third rectifying column through a pipeline, the fourth rectifying column is provided with a bottom product outlet, the top product outlet of the first rectifying column, the bottom product outlet of the second rectifying column, and the oil outlet of the demixer are each connected on a pipeline through a pipeline respectively, the pipeline is connected with the storage tank.

It is more preferable that any of the aforementioned system employs one or more (e.g., all) of the above preferred embodiments.

In summary, the present disclosure provides a producing method and a producing system for a clean gasoline, which is suitable for upgrading the inferior gasoline, and is particularly suitable for high sulfur and high olefin catalytic cracking gasoline, which is capable of ultra-deep desulfurization while maintaining or improving the octane value of gasolines. Compared with the prior art, the light gasoline fraction and the medium gasoline fraction undergo esterification reaction with acetic acid and formic acid respectively in the present disclosure, avoiding the production of macromolecule esters of the light gasoline fraction and the medium gasoline esterification fraction; performing a extractive distillation desulphurization of the medium gasoline fraction before the esterification, to obtain olefin-rich raffinate oil and the extracted oil, then extracted oil mixed with the heavy gasoline fraction alone for hydrodesulfurization, avoiding the unnecessary loss of octane value in the process of hydrogen saturation of the medium gasoline. For the raw materials with exceeding benzene content, after debenzolization treatment of benzene-rich extracted oil, hydrodesulfurization is performed, so as to achieve the purpose of benzene reduction; a two stage hydrodesulfurization is provided during the treatment of the heavy gasoline, the removal of large molecules of sulfur is performed firstly, and then remove the small molecules of sulfur (sulfides such as thiols produced by olefins and $H_2S$ generated by the one-stage hydrodesulfurization), and then $H_2S$ is separated. Next, the hydrocarbon isomerization/aromatization reaction is performed, avoiding the long time of contact between $H_2S$ and olefins to produce thiols. The producing method provided by the present disclosure can upgrade a inferior gasoline with a sulfur content of 300 to 2000 $\mu g \cdot g^{-1}$, an olefin content of 25 to 50 v % to a high quality gasoline with a sulfur content $\leq 10$ $\mu g \cdot g^{-1}$, an olefin content $\leq 15$ v %, and the method makes the octane value being without lost or being improved, the product liquid yield $\geq 99.3$ wt %.

Example 1

This Example provides a method for producing a ultra-low sulfur and high-octane gasoline by subjecting an FCC gasoline (full range gasoline, raw oil 1) with a sulfur content of 625.3 $\mu g \cdot g^{-1}$, a olefin content of 35.6 v %, a aromatics content of 14.4 v %, a isoparaffin content of 18.2 v %, and a benzene content of 0.7 v % as the raw material to hydro-upgrading treatment, wherein the composition ratio of each catalyst is as follows, based on the total weight of each catalyst:

Directional sulfur transfer catalyst: 12 wt. % NiO, 6 wt. % $MoO_3$, 2 wt. % $La_2O_3$, 20 wt. % HZSM-5 with hierarchically pores, 60 wt. % $Al_2O_3$—$SiO_2$ (silicon-containing alumina);

Light gasoline esterification catalyst: 40 wt. % HZSM-5, 60 wt. % $Al_2O_3$—$SiO_2$ (silicon-containing alumina);

Medium gasoline esterification catalyst: 50 wt. % HZSM-5, 50 wt. % $Al_2O_3$—$SiO_2$ (silicon-containing alumina);

Medium gasoline extraction solvent: 90 wt. % sulfolane and 10 wt. % tetraethylene glycol;

One-stage selective hydrodesulfurization catalyst: 4 wt. % CoO, 12 wt. % $MoO_3$, 3 wt. % $K_2O$, 2 wt. % $P_2O_5$ and Al—Si—Mg composite oxides, the Al—Si—Mg composite oxide is consisting of 67 wt. % $Al_2O_3$, 8 wt. % $SiO_2$, 4 wt. % MgO;

Two-stage selective hydrodesulfurization catalyst: 8.0 wt. % NiO, 5.4 wt. % $MoO_3$, 1.2 wt. % $K_2O$ and Al—Si composite oxide carrier, the Al—Si composite oxide carrier is consisting of 76.3 wt. % $Al_2O_3$, 9.1 wt. % $SiO_2$; and Hydrocarbon isomerization/aromatization catalyst: 2.0 wt. % CoO, 6.0 wt. % $MoO_3$, 1.0 wt. % $P_2O_5$, 65.0 wt. % modified HZSM-5 and Al—Ti composite oxide binder, the Al—Ti composite oxide binder is consisting of 21.0 wt. % $Al_2O_3$, 5.0 wt. % $TiO_2$.

The specific preparation steps of the directional sulfur transfer catalyst are as follows: 2.12 g NaOH and 280 mL deionized water were stirred and mixed at 60° C., 1.4 g $Al_2(SO_4)_3 \cdot 18H_2O$, 10.48 g TPABr and 26.16 g TEOS were added and mixed uniformly in order to obtain the mixed system of the starting sol; adding 5.4 g polyquaternium PCD (polymerization degree n=16, molecular weight of 8000) to the mixed system of the starting sol, aged for 24 h after the mixed system is stirred uniformly; the resulting final mixture was transferred to a stainless steel reaction kettle with a polytetrafluoroethylene liner, crystallizing at 170° C. for 72 h; the crystallized product was ultrasonically cleaned and separated in order to obtain the ZSM-5 zeolite with hierarchically pores composite containing template agents, which was washed with deionized water to pH=7 to 8, and then dried at 120° C. for 12 h to obtain a ZSM-5 zeolite with hierarchically pores composite containing template agents; calcining the above ZSM-5 zeolite with hierarchically pores composite containing template agents at 600° C. for 6 h in order to remove the template agent, to obtain a ZSM-5 zeolite with hierarchically pores composite without template agents; the above ZSM-5 zeolite with hierarchically pores composite is subjected to ammonium exchange treatment using 2 mol/L $NH_4Cl$ solution, the ammonium exchange treatment is performed in a liquid:solid ($NH_4Cl$ solution: composite) mass ratio of 10:1, the treatment temperature is 80° C., and the ammonium exchange treatment is performed twice, after each ammonium exchange treatment is completed, the obtained products were dried at 120° C. for 6 h, calcined at 500° C. for 4 h to obtain HZSM-5 zeolite with cascade pores composite.

60.0 g of Si—Al powder (containing $Al_2O_3$ 92.0 wt. %, SiO 8.0 wt. %), 20.0 g of the above HZSM-5 with hierarchically pores and 2.5 g of sesbania powder were weighed, ground and homogenized, to which 6 ml of 65 wt. % nitric acid aqueous solution was added, fully kneaded, molded by an extruder, dried at 120° C. for 4 h, and calcined at 550° C. for 5 h, then a cloverleaf pattern catalyst carrier with a diameter of 2 mm was obtained.

Nickel nitrate, ammonium molybdate and lanthanum nitrate mixed solution were prepared based on the stoichiometric ratio. Then, the immersion liquid was uniformly added to the above catalyst carrier by equal volume impregnation method and dried at 120° C. for 4 h, calcined at 550° C. for 4 h, then a directional sulfur transfer catalyst was obtained.

The specific preparation steps of the light gasoline esterification catalyst are as follows:

ZSM-5 zeolite with a Si/Al ratio of 35 and 1 mol/L $NH_4Cl$ aqueous solution was mixed at a weight ratio of 1:10, stirred at 80° C. for 4 h, filtered, washed, dried and calcined at 550° C. for 5 h; the above process was repeated once to obtain ammonium exchanged HZSM-5 zeolite.

30.0 g of Si—Al powder (containing $Al_2O_3$ 92.0 wt. %, SiO 8.0 wt. %), 20.0 g of the above HZSM-5 zeolite and 1.9 g of sesbania powder were weighed, ground and homogenized, to which 4.5 ml of 65 wt. % nitric acid aqueous solution was added, fully kneaded, molded by an extruder, dried at 120° C. for 4 h, and calcined at 550° C. for 5 h, then a cloverleaf pattern light gasoline esterification catalyst with a diameter of 2 mm was obtained.

The specific preparation steps of the medium gasoline esterification catalyst are as follows:

ZSM-5 zeolite with a Si/Al ratio of 35 and 1 mol/L $NH_4Cl$ aqueous solution was mixed at a weight ratio of 1:10, stirred at 80° C. for 4 h, filtered, washed, dried and calcined at 550° C. for 5 h; the above process was repeated once to obtain ammonium exchanged HZSM-5 zeolite.

25.0 g of Si—Al powder (containing $Al_2O_3$ 92.0 wt. %, SiO 8.0 wt. %), 25.0 g of the above HZSM-5 zeolite and 1.9 g of sesbania powder were weighed, ground and homogenized, to which 4.5 ml of 65 wt. % nitric acid aqueous solution was added, fully kneaded, molded by an extruder, dried at 120° C. for 4 h, and calcined at 550° C. for 5 h, then a cloverleaf pattern medium gasoline esterification catalyst with a diameter of 2 mm was obtained.

The specific preparation steps of a one-stage selective hydrodesulfurization catalyst are as follows:

70.0 g of a Al—Si—Mg composite powder with proper Al/Si/Mg ratio (water content of 25 wt. %) and 2.0 g of sesbania powder were weighed, ground and homogenized, to which fully kneaded, a cloverleaf pattern bar with a diameter of 2 mm was extruded from an extruder, and was dried at 120° C. for 3 h, and calcined at 520° C. for 4 h, then a molded catalyst carrier was obtained; 40.0 g of the above catalyst carrier was immersed in a mixed impregnation solution of 35 mL of potassium nitrate and diammonium phosphate, and the impregnation solution contains 1.5 g of $K_2O$ and 1.0 g of $P_2O_5$, based on the oxides, and then aged for 5 h at room temperature, and further dried at 120° C. for 3 h, calcined at 520° C. for 4 h, a catalyst carrier loading potassium and phosphorus was obtained; 32.0 mL of a cobalt nitrate and ammonium molybdate mixture solution containing 2.0 g of CoO and 6.1 g of $MoO_3$ (the content of each active ingredient is based on the oxide form, which does not limit the active ingredient in the mixture is present as an oxide) was formulated, and 3.0 mL of ammonia solution in water at a concentration of 17% was added and sufficiently shaken until the solid was completely dissolved to form an impregnation solution. Then, the catalyst carrier loading potassium and phosphorus was immersed in the immersion solution and aged for 5 h at room temperature, and dried at 120° C. for 3 h, calcined at 520° C. for 5 h, then the one-stage selective hydrodesulfurization catalyst was obtained.

The specific preparation steps of a two-stage selective hydrodesulfurization catalyst are as follows:

70.0 g of a Al—Si composite powder with proper Al/Si ratio (water content of 25 wt. %) and 2.0 g of sesbania powder were weighed, ground and homogenized, and 5 mL of nitric acid aqueous solution with a mass concentration of 65 wt. % was added, fully kneaded, then a cloverleaf pattern bar with a diameter of 2 mm was extruded by an extruder, which was dried at 120° C. for 3 h, and calcined at 520° C. for 4 h, a molded catalyst carrier was obtained; 40.54 g of the above catalyst carrier was immersed in an impregnation solution of 35 mL of potassium nitrate, and the impregnation solution contains 0.57 g of $K_2O$, based on the oxides, and then aged for 5 h at room temperature, and further dried at 120° C. for 3 h, calcined at 520° C. for 4 h, a catalyst carrier loading potassium was obtained; 32.0 mL of a cobalt nitrate and ammonium molybdate mixture solution containing 3.8 g NiO and 2.56 g $MoO_3$ (the content of each active ingredient is based in the form of an oxide, which does not limit the active ingredient in the mixture to be presented as an oxide) was formulated, and 3.0 mL of ammonia in water at a concentration of 17% was added and sufficiently shaken until the solid was completely dissolved to form an impregnation solution. Then, the catalyst carrier loading potassium was immersed in the immersion solution and aged for 5 h at room temperature, and dried at 120° C. for 3 h, calcined at 520° C. for 5 h, the two-stage selective hydrodesulfurization catalyst was obtained.

The specific preparation steps of the hydrocarbon isomerization/aromatization catalyst are as follows:

It can be prepared by the method described in CN101508912A (Patent No. ZL200910080112.1) (the preparation method of the two-stage catalyst in Example 1 of CN101508912A is hereby incorporated by reference), except that the inorganic acid-organic acid treatment after hydrothermal treatment in the preparation method disclosed in CN101508912A is changed to a single inorganic acid treatment after hydrothermal treatment (treatment conditions are the same).

As shown in FIG. 1, the producing system comprises the directional sulfur transfer reactor 101, the light gasoline cutting column 102 used for cutting the light gasoline fraction and the heavy component, the heavy component cutting column 103 used for cutting the medium gasoline fraction and the heavy gasoline fraction, the light gasoline esterification reactor 104, the acetic acid rectification separation system 105 for removing acetic acid, the extractive distillation system 106 for separating the extracted oil and the raffinate oil, the medium gasoline esterification reactor 111, the formic acid extraction system, the coalescence dehydrator 112, the one-stage hydrodesulfurization reactor 107, the two-stage hydrodesulfurization reactor 108, the stripping column 109, and the hydrocarbon isomerization/aromatization reactor 110; wherein the directional sulfur transfer reactor 101 is provided with a feed inlet, the reactant outlet of the directional sulfur transfer reactor 101 is connected with the feed inlet of the light gasoline cutting column 102 through a pipeline, the light gasoline fraction outlet of the light gasoline cutting column 102 is connected with the inlet of raw material of reaction of the light gasoline esterification reactor 104 through a pipeline, the heavy component outlet of the light gasoline cutting column 102 is connected with the feed inlet of the heavy component cutting column 103 through a pipeline, the reactant outlet of the light gasoline esterification reactor 104 is connected with the acetic acid rectification separation system 105 through a pipeline, the medium gasoline fraction outlet of the heavy component cutting column 103 is connected with the extractive distillation system 106 through a pipeline, the raffinate oil outlet of the extractive distillation system 106 is connected with the inlet of raw material of reaction of the medium gasoline esterification reactor 111 through a pipeline, the reactant outlet of the medium gasoline esterification reactor 111 is connected with the formic acid extraction system through a pipeline, the outlet of the formic acid extraction system is connected with the feed inlet of the coalescence dehydrator 112 through a pipeline, the heavy gasoline fraction outlet of the heavy component cutting column 103 is connected with the feed inlet of the one-stage hydrodesulfurization reactor 107 through a pipeline, the extracted oil outlet of the extractive distillation system 106 is connected with the feed inlet of the one-stage hydrodesulfurization reactor 107 through a pipeline, the one-stage hydrodesulfurization reactor 107, the two-stage hydrodesulfurization reactor 108, the stripping column 109 and the hydrocarbon isomerization/aromatization reactor 110 are arranged in series; the esterified light gasoline outlet of the acetic acid rectification separation system 105, the esterified medium gasoline outlet of the coalescence dehydrator 112 and the treated heavy gasoline outlet of the hydrocarbon isomerization/aromatization reactor 110 are all connected to one storage tank.

As shown in FIG. 1, a low-temperature directional sulfur transfer reaction occurs upon contact of the full range gasoline (i.e., raw oil 1) with a directional sulfur transfer catalyst under the condition of hydrogen in the directional sulfur transfer reactor 101. The properties of the raw oil 1 are shown in Table 1. The reaction conditions of the directional sulfur transfer reaction are: the pressure is 2.4 MPa, the temperature is 135° C., the liquid volume space velocity is 3 $h^{-1}$, the hydrogen/oil volume ratio is 7; and then, after the directional sulfur transfer reaction, the oil is subjected to light gasoline cutting in the light gasoline cutting column 102, the light gasoline fraction and the heavy component are obtained, and the obtained heavy component is cut in the heavy component cutting column 103, to obtain the medium gasoline fraction and the heavy gasoline fraction, wherein the cutting temperature of the light gasoline fraction is 65° C., and the cutting temperature of the medium and heavy gasoline fraction is 120° C. That is, the fraction collected below 65° C. is the light gasoline fraction, the fraction collected between 65° C. and 120° C. is the medium gasoline fraction, the fraction collected higher than 120° C. is the heavy gasoline fraction.

The obtained light gasoline fraction is mixed with acetic acid, and entered into a fixed bed reactor, i.e. the light gasoline esterification reactor 104, under the action of a light gasoline esterification catalyst, olefins in the light gasoline fraction undergo a esterification reaction, the conditions of the reaction are: the pressure is 2.0 MPa, the temperature is 110° C., the liquid volume space velocity is 2.5 $h^{-1}$ (based on acetic acid), the weight ratio of the acetic acid and the olefins in the light gasoline fraction is 1.2:1; after the esterification reaction of the light gasoline fraction, the product is fed to the acetic acid rectification separation system 105 to undergo rectification, in order to remove the unreacted acetic acid, to obtain the esterified light gasoline.

Figure 5:
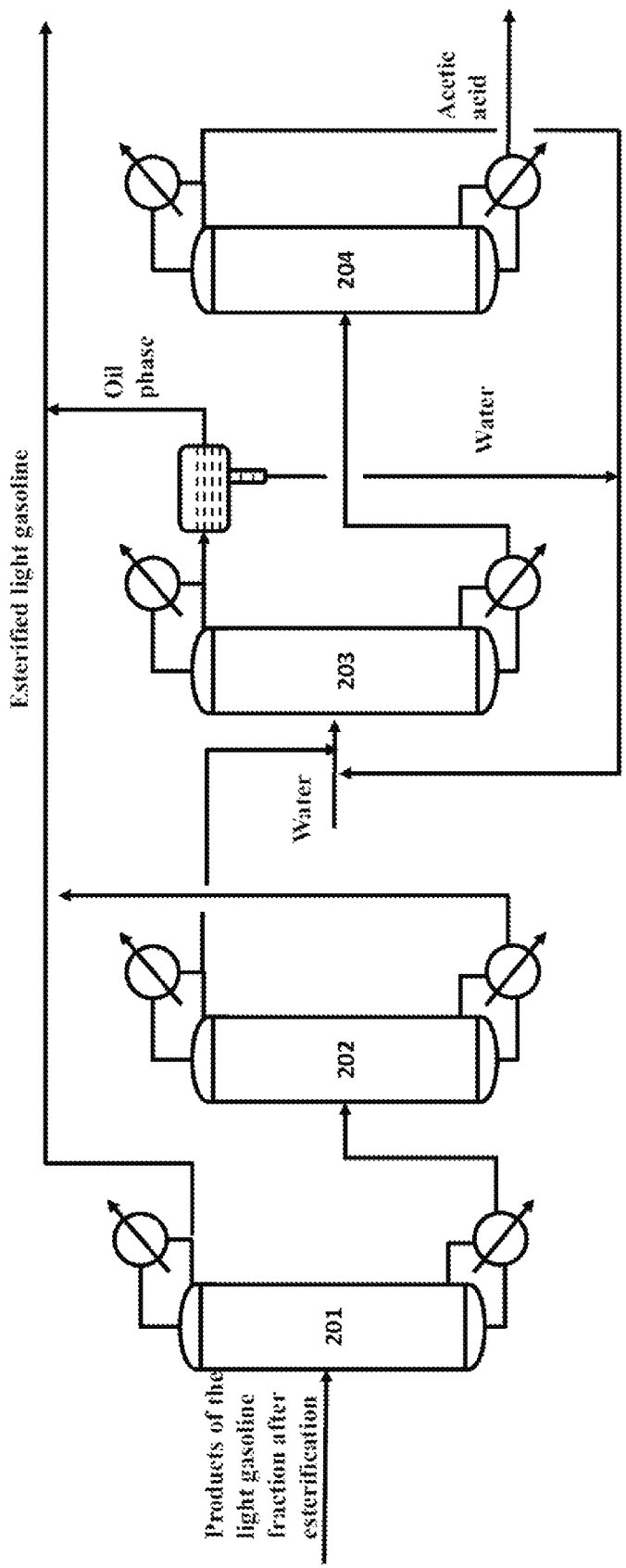
FIG. 5 is a schematic flow diagram and a system of an acetic acid rectification separation system of a producing method for an ultra-clean high-octane gasoline provided in Examples 1, 2, 3 and 4 of the present disclosure.

As shown in FIG. 5, the acetic acid rectification separation system 105 comprises a first rectifying column 201, a second rectifying column 202, a third rectifying column 203 and a fourth rectifying column 204, wherein the feed inlet of the first rectifying column 201 is connected with the reactant outlet of the light gasoline esterification reactor 104 through a pipeline, the bottom product outlet of the first rectifying column 201 is connected with the feed inlet of the second rectifying column 202 through a pipeline, the top product outlet of the second rectifying column 202 is connected with the feed inlet of the third rectifying column 203 through a pipeline, the feed inlet of the third rectifying column 203 is also connected with the water pipeline, the top product outlet of the third rectifying column 203 is connected with a demixer through a pipeline, the demixer is provided with an oil outlet and a water outlet, the water outlet is also connected with the feed inlet of the third rectifying column 203 through a pipeline, the bottom product outlet of the third rectifying column 203 is connected with the feed inlet of the fourth rectifying column 204 through a pipeline, the top product outlet of the fourth rectifying column 204 is connected with the feed inlet of the third rectifying column 203 through a pipeline, the fourth rectifying column 204 is provided with a bottom product outlet, the top product outlet of the first rectifying column 201, the bottom product outlet of the second rectifying column 202, the outlet of the demixer is connected on the same pipeline through a pipeline respectively, the pipeline is also connected with the storage tank.

As shown in FIG. 5, in the acetic acid rectification separation system 105, the product from the esterification reaction of the light gasoline fraction enters the first rectifying column 201 firstly, the top product (the light gasoline) and the kettle product (the esters and unreacted acetic acid) are obtained by the rectification separation; the kettle product of the first rectifying column 201 enters the second rectifying column 202, the top product (the esters with a low boiling point and acetic acid) and the kettle product (the esters with a high boiling point) are obtained by the rectification separation; the top product of the second rectifying column 202 enters the third rectifying column 203, while introducing water as the entrainer into the third rectifying column, the molar ratio of the entrainer and the top product of the second rectifying column 202 is 1:2.45, the top product (the esters with a low boiling point and water) and the kettle product (the acetic acid and water) are obtained by a rectification separation; the top product of the third rectifying column 203 is layered to an oil phase and an aqueous phase, the oil phase is mixed with the top product of the first rectifying column 201 and the kettle product of the second rectifying column 202, in order to obtain the esterified light gasoline with removal of the acetic acid; the kettle product of the third rectifying column 203 enters the fourth rectifying column 204, the top product (water) and the kettle product (acetic acid) are obtained by a rectification separation, the kettle product can be mixed with fresh acetic acid, the esterification reaction is continued, after the mixing of the top product with the aqueous phase of the third rectification 203 and fresh water, the top product is continued to be involved in the rectification as an entrainer; wherein:

The number of column plates of the first rectifying column 201 is 30, the number of feed plates is 18, the operating conditions are: the column top temperature is controlled to be 30° C., the column top pressure is 1 atm, the column kettle temperature is 146° C., the column kettle pressure is 1.2 atm, the reflux ratio is 2;

The number of column plates of the second rectifying column 202 is 70, the number of feed plates is 14, the operating conditions are: the column top temperature is controlled to be 123° C., the column top pressure is 1 atm, the column kettle temperature is 163° C., the column kettle pressure is 1.5 atm, the reflux ratio 15;

The number of column plates of the third rectifying column 203 is 36, the number of feed plates is 18, the operating conditions are: the column top temperature is controlled to be 88° C., the column top pressure is 1 atm, the column kettle temperature is 114° C., the column kettle pressure is 1.2 atm, the reflux ratio is 10; and The number of column plates of the fourth rectifying column is 40, the number of feed plates is 24, the operating conditions are: the column top temperature is controlled to be 100° C., the column top pressure is 1 atm, the column kettle temperature is 126° C., the column kettle pressure is 1.3 atm, and the reflux ratio is 10.

Figure 6:
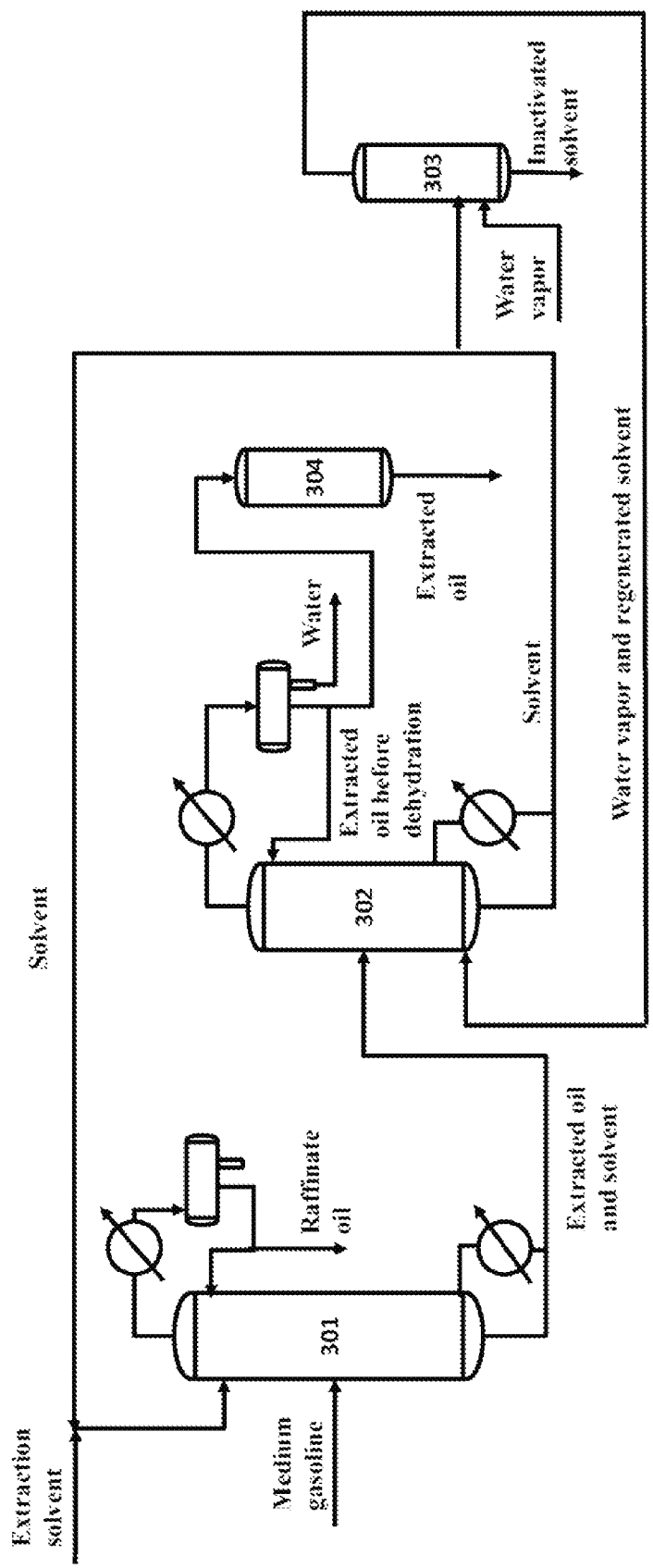
FIG. 6 is a schematic flow diagram and a system of a medium gasoline extractive distillation system of a producing method for an ultra-clean high-octane gasoline provided in Examples 1, 2, 3 and 4 of the present disclosure.

As shown in FIG. 6, the extractive distillation system 106 comprises an extractive distillation column 301, a desulfurization column 302, a coalescence dehydrator 304 and a regeneration column 303, the top of the extractive distillation column 301 is provided with an extraction solvent inlet, the feed inlet of the extractive distillation column 301 is connected with the medium gasoline fraction outlet through a pipeline, the top of the extractive distillation column 301 is provided with an raffinate oil outlet equipped with a reflux device, the bottom product outlet of the extractive distillation column 301 is connected with the feed inlet of the desulfurization column 302 through a pipeline, the top of the desulfurization column 302 is provided with a pre-dehydration extracted oil outlet and a reflux inlet equipped with a reflux device, the coalescence dehydrator 304 is provided with a pre-dehydration extracted oil inlet and an extracted oil outlet, the pre-dehydration extracted oil outlet on the top of the desulfurization column 302 is connected with the reflux inlet on the top of the desulfurization column 302 and the pre-dehydration extracted oil inlet of the coalescence dehydrator 304, respectively. The kettle of the desulfurization column 302 is provided with the water vapor and solvent inlet, the bottom product outlet of the desulfurization column 302 is connected with the extraction solvent inlet and the feed inlet of the regeneration column 303 through a pipeline respectively, the kettle of the regeneration column 303 is provided with the water vapor inlet, the top product outlet of the regeneration column 303 is connected with the water vapor and solvent inlet of the desulfurization column 302 through a pipeline, the regeneration column 303 is provided with a bottom deactivated solvent outlet.

As shown in FIG. 6 is the medium gasoline fraction extractive distillation system 106. First, the medium gasoline fraction enters the extractive distillation column 301, and is sufficiently contacted with the extraction solvent injected from the top of the column, the extraction solvent dissolves the sulfides and aromatics in the medium gasoline fraction, which enters the bottom of the extractive distillation column 301; a raffinate oil is obtained on the top of the extractive distillation column 301, the extracted oil and solvent obtained at the bottom of the column enters the desulfurization column 302.

Then, the extracted oil and solvent are rectified in the desulfurization column 302, the water vapor and the regenerated solvent from the regeneration column are passed to the bottom of the desulfurization column 302, the top product is subjected to delamination to obtain the pre-dehydration extracted oil and water, the pre-dehydration extracted oil partially refluxed, and partially go through the dehydration in coalescence dehydrator 304 in order to obtain the extracted oil, the extracted oil is the product of this step, a portion of the solvent obtained at the bottom of the column is returned to the extractive distillation column 301 and the other portion is fed to the regeneration column 303 for solvent regeneration.

Finally, the bottom of the regeneration column 303 is introduced with the water vapor to perform stripping regeneration of solvent, the water vapor and the regenerated solvent are discharged from the top of the column, returned back to the bottom of the desulfurization column 302, and the deactivated solvent is discharged from the bottom of the column; wherein:

The number of column plates of the extractive distillation column 301 is 85, the number of feed plates is 52, the operating conditions are controlled to be: the column top temperature is 97° C., the column top pressure is 0.5 atm, the column kettle temperature is 170° C., the column kettle pressure is 1.35 atm, the reflux ratio is 0.5, the mass ratio of the extraction solvent and the medium gasoline fraction is 3:1;

The number of column plates of the desulfurization column 302 is 19, the number of feed plates is 3, the operating conditions are controlled to be: the column top temperature is 97° C., the column top pressure is −0.6 atm, the column kettle temperature is 174° C., the column kettle pressure is −0.4 atm, the reflux ratio is 0.5, the mass ratio of the kettle product returned to the extractive distillation column 301 and that went into the regeneration column 303 is 130:1; and The temperature of the regeneration column is controlled to be 154° C., the feed mass ratio of the water vapor and the solvent is 7:4.

The esterification reaction of raffinate oil is: Mixing the aforementioned obtained raffinate oil and the formic acid, then the mixture was contacted with the medium gasoline esterification catalyst, the olefin in the raffinate oil undergoes an esterification reaction in the medium gasoline esterification reactor 111; Mixing the reaction product with the formic acid extractant (water and formic acid aqueous solution), stirring, delaminating, to obtain the aqueous esterified medium gasoline and formic acid aqueous solution extract; the aqueous esterified medium gasoline goes through the coalescence dehydrator 112 to undergo dehydration in order to obtain the esterified medium gasoline; a portion of the formic acid aqueous solution extract are used for separation and purification of the formic acid, the other portion is further used as formic acid extractant to mix with the esterification product, stirring, delaminating, to extract the unreacted formic acid in the esterification product.

The esterification reaction conditions of the raffinate oil are: the molar ratio of the formic acid and olefins in the raffinate oil is 1:1, the reaction temperature is 120° C., the pressure is 2.0 MPa, the volume space velocity is 2.5 $h^{-1}$; in the mixture of the formic acid extractant and the esterification product, the mass ratio of the formic acid extractant and the esterification product is 1:1, the mass ratio of formic acid aqueous solution extract used for separation and purification and that used as the formic acid extractant is 1:100.

As shown in FIG. 1, the heavy gasoline fraction is mixed with the extracted oil to obtain a mixed oil, the mixed oil is subjected to the operations in series, firstly, the mixed oil is contacted with an one-stage selective hydrodesulfurization catalyst in the one-stage hydrodesulfurization reactor 107 to perform an one-stage hydrodesulfurization reaction, the reaction conditions are: the pressure is 1.5 MPa, the temperature is 250° C., the liquid volume space velocity is 3.5 $h^{-1}$, the hydrogen/oil volume ratio is 300:1; then the resultant contacts with a two-stage selective hydrodesulfurization catalyst in the two-stage hydrodesulfurization reactor 108 to perform a two-stage hydrodesulfurization reaction, the reaction conditions are: the pressure is 1.5 MPa, the temperature is 330° C., the liquid volume space velocity is 3.2 $h^{-1}$, the hydrogen/oil volume ratio is 300:1; then the resultant enters the stripping column 109 to remove $H_2S$, the bottom temperature of the stripping column is controlled to be 175° C., the column top temperature to be 75° C., the pressure is 0.5 MPa; finally, the resultant contacts with a hydrocarbon isomerization/aromatization catalyst in the hydrocarbon isomerization/aromatization reaction 110, a hydrocarbon isomerization/aromatization reaction is performed to obtain the treated heavy gasoline, the reaction conditions are: the pressure is 1.5 MPa, the temperature is 350° C., the liquid volume space velocity is 1.5 $h^{-1}$, the hydrogen/oil volume ratio is 300:1.

After the completion of the reaction, the esterified light gasoline, the esterified medium gasoline and the treated heavy gasoline are blended to obtain an ultra-clean high-octane gasoline.

During the reaction, all the catalysts are diluted with porcelain sand, and after each reactor or reaction device is determined to be airtight, the directional sulfur transfer catalyst, the one-stage selective hydrodesulfurization catalyst, the two-stage selective hydrodesulfurization catalyst and the hydrocarbon isomerization/aromatization catalyst were each dried and presulfurized respectively, the drying conditions are: 120° C., $N_2$ atmosphere, $N_2$ space velocity 1000 $h^{-1}$; the presulfurization steps are: $N_2$ in the catalyst bed is completely replaced by $H_2$, and the space velocity of $H_2$ is maintained to be 900 $h^{-1}$, the temperature of the catalyst bed is adjusted to 150° C., a straight-run naphtha is injected to the catalyst bed at volume space velocity of 3 $h^{-1}$, the hydrogen/oil volume ratio is adjusted to 300:1; the catalyst bed is heated to 180° C. at a speed of 20° C./h, injecting of the vulcanizing agent (dimethyl disulfide) is started, with the injection rate adjusted to be 30 wt. % of straight-run naphtha, and then the temperature is raised to 230° C. at a speed of 15° C./h, and kept at this temperature for 8 h; the temperature is raised to 280° C. at a speed of 15° C./h, and kept at this temperature for 8 h; the temperature is raised to 320° C. at a speed of 15° C./h, and kept at this the temperature for 8 h; the reaction temperature of each catalyst bed is lowered at a speed of 20° C./h; Finally, the oil for the reaction is used to replace the sufurized oil in the system, the sulfidation is ended. The space velocity and hydrogen/oil ratio are adjusted, the corresponding reaction is performed according to the above steps, and the sampling analysis starts after 100 h of reaction stabilization. Table 1 shows the properties of upgraded gasoline products.

TABLE 1

The properties and parameters of the full range raw oil 1 and upgraded blended product of the light, medium and heavy gasoline in Example 1

| Item | Raw Oil 1 | The blended product of the light, medium and heavy gasolines |
|---|---|---|
| yield (wt %) | — | 99.6 |
| density (g/mL) | 0.724 | 0.726 |
| distillation range | 34-201 | 33-203 |
| content of typical hydrocarbons (v %) | | |
| aromatics | 14.4 | 16.6 |
| olefin | 35.6 | 14.8 |
| isoparaffin | 18.2 | 21.9 |
| sulfur (μg · $g^{-1}$) | 625.3 | 8.2 |
| RON | 89.5 | 90.0 |

As can be seen from Table 1, the modified method of this Example can reduce the sulfur content of FCC gasoline from 625.3 μg·$g^{-1}$ to 8.2 μg·$g^{-1}$, and the olefin content reduces from 35.6 v % to 14.8 v %, the isoparaffin content increases from 18.2 v % to 21.9 v %, the aromatics content increases from 14.4 v % to 16.6 v %. Meanwhile, the esterification of olefins in the light gasoline fraction and the medium gasoline fraction leads to the RON of the blended product increased by 0.5 unit, the liquid yield of 99.6 wt % under the conditions of ultra-deep desulfurization and significant olefin reduction of the full range raw oil, and the blended product conforms to the requirement of National VI clean gasoline standard.

Example 2

The Example provides a method and a system for producing an ultra-clean high-octane gasoline which uses the aforementioned raw oil 1 as the raw material.

Figure 2:
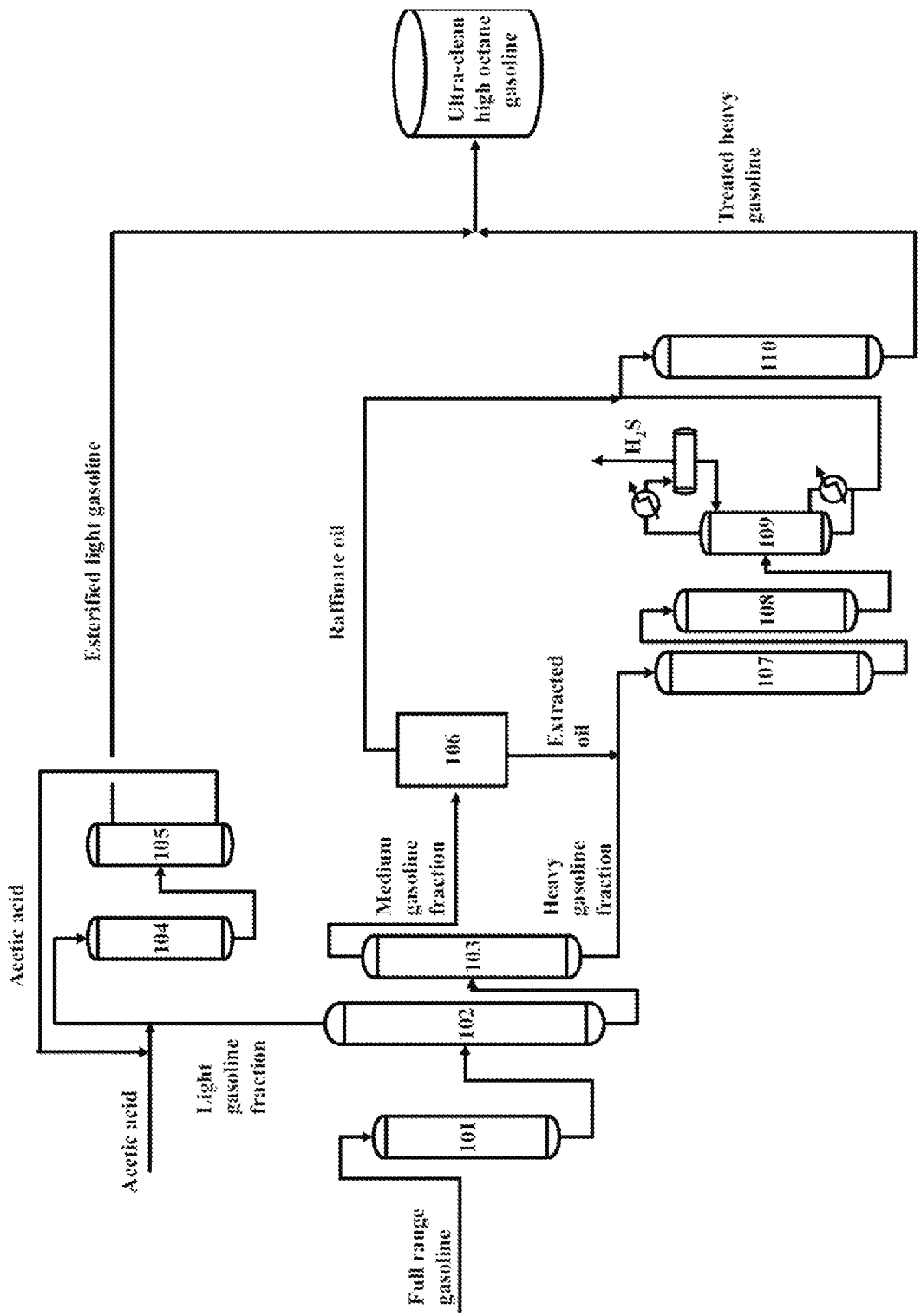
FIG. 2 is a schematic flow diagram and a system of a method for producing an ultra-clean high-octane gasoline provided in Example 2 of the present disclosure.

As shown in FIG. 2, the system of this Example is substantively same as Example 1, except that the raffinate oil outlet of the extractive distillation system 106 is not connected with the inlet of raw material of reaction of the medium gasoline esterification reactor 111, but directly connected on the inlet of raw material of reaction of the hydrocarbon isomerization/aromatization reactor 110 through a pipeline; that is, the medium gasoline esterification reactor 111, the formic acid extraction system and the coalescence dehydrator 112 are not included in this system, but the raffinate oil outlet of the extractive distillation system 106 is directly connected with the inlet of raw material of reaction of the hydrocarbon isomerization/aromatization reactor 110 through a pipeline, the rest is the same as aforementioned producing system.

In accordance with the system of the Example, the process flow of the Example is similar to that of Example 1, except that the process flow of the Example does not perform the esterification reaction of the raffinate oil. Instead, the raffinate oil is mixed with the $H_2S$-removal product after the stripping column 109, together subjected to the hydrocarbon isomerization/aromatization reaction. The remaining parameters of reaction devices, the reaction conditions, the catalysts and the preparation methods and treatment thereof are all the same as Example 1, and the results are shown in Table 2:

TABLE 2

The properties and parameters of the upgraded blended product of the light, medium and heavy gasoline in Example 2

| Item | The blended product of the light, medium and heavy gasoline |
|---|---|
| yield (wt %) | 99.4 |
| density (g/mL) | 0.727 |
| distillation range | 33-204 |
| content of typical hydrocarbons (v %) | |
| aromatics | 18.5 |
| olefin | 14.0 |
| isoparaffin | 25.8 |
| sulfur ($\mu g \cdot g^{-1}$) | 8.5 |
| RON | 89.8 |

As can be seen from Table 2, the modified method of this Example can reduce the sulfur content of FCC gasoline from 625.3 $\mu g \cdot g^{-1}$ to 8.5 $\mu g \cdot g^{-1}$, and the olefin content reduces from 35.6 v % to 14.0 v %, the isoparaffin content increases from 18.2 v % to 25.8 v %, the aromatics content increases from 14.4 v % to 18.5 v %. Meanwhile, the esterification of olefins in the light gasoline fraction and the hydrocarbon isomerization/aromatization of the medium gasoline raffinate oil and the heavy gasoline leads to the RON of the blended product increased by 0.3 unit, the liquid yield of 99.4 wt % under the conditions of ultra-deep desulfurization and significant olefin reduction of the full range raw oil, and the blended product conforms to the requirement of National VI clean gasoline standard.

Example 3

The Example provides a method and a system for producing an ultra-clean high-octane gasoline which uses a high-sulfur, high-olefin, high-benzene FCC gasoline with the sulfur content of 1230.0 $\mu g \cdot g^{-1}$, the olefin content of 42.3 v %, the aromatics content of 20.3 v %, the isoparaffin content of 20.2 v %, benzene content 1.5 v % (raw oil 2, its properties can be seen in table 3) as the raw material.

Figure 3:
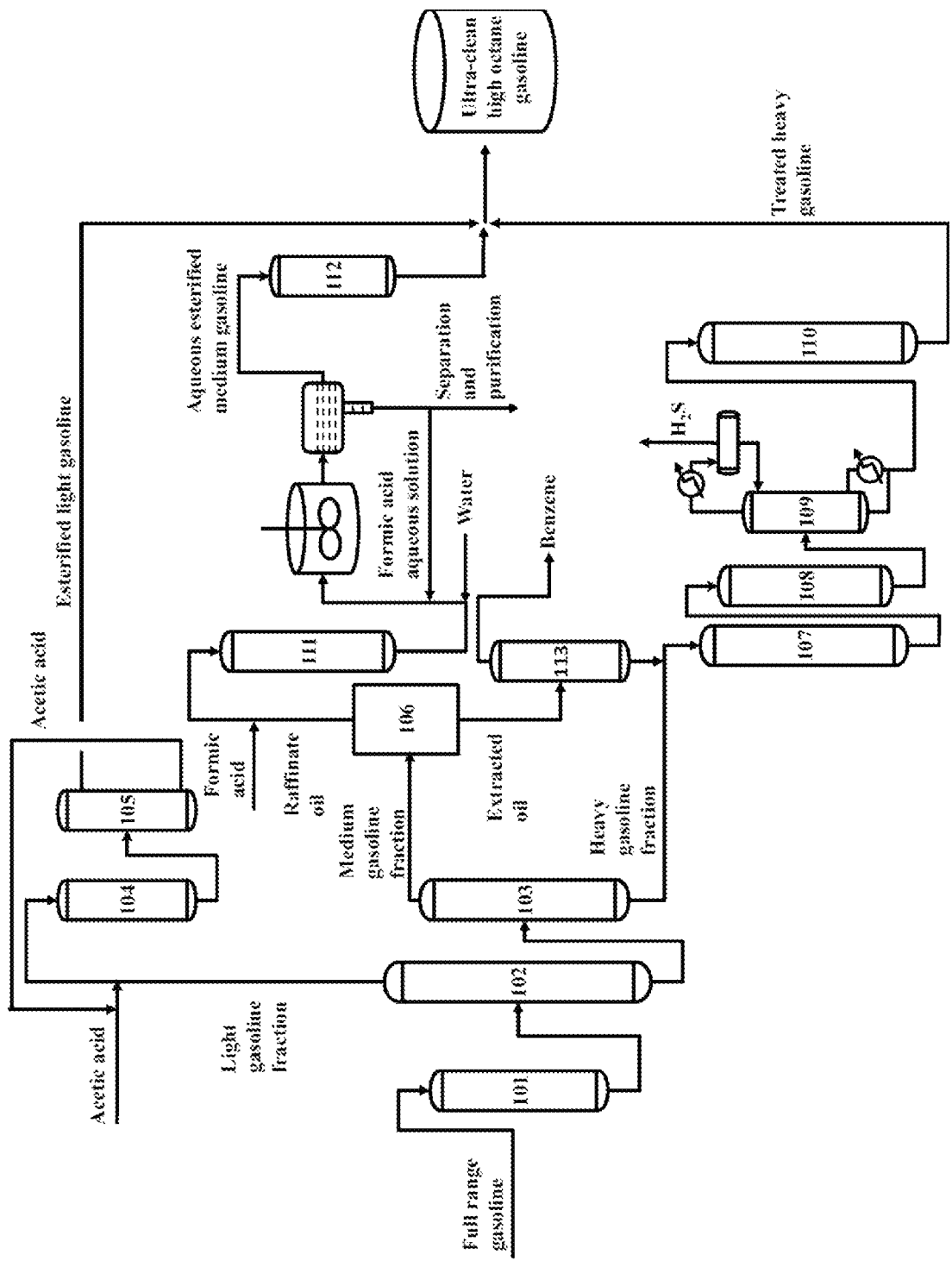
FIG. 3 is a schematic flow diagram and a system of a method for producing an ultra-clean high-octane gasoline provided in Example 3 of the present disclosure.

As shown in FIG. 3, the system of this Example is basically the same as Example 1, except that the debenzolization column 113 is provided on the pipeline between the extracted oil outlet of the extractive distillation system 106 and the reaction feed inlet of the one-stage hydrodesulfurization reactor 107, in the debenzolization column 113, the extracted oil outlet after debenzolization is connected with the one-stage hydrodesulfurization reactor 107, the rest is the same as Example 1.

The use of raw oil 2 to produce ultra-clean high-octane gasoline is as follows: The system of the Example is similar to that of Example 1, in the process of the Example, the extracted oil is subjected to the debenzolization treatment before mixing with the heavy gasoline fraction, the catalysts and the preparation method thereof in the Example are the same as Example 1. Parts of the parameters of the reaction devices and the specific reaction conditions are as follows, the unmentioned parameters of the reaction devices and reaction conditions are the same as Example 1.

The reaction conditions of the directional sulfur transfer reaction are: the pressure is 2.4 MPa, the temperature is 130° C., the liquid volume space velocity is 3 $h^{-1}$, and the hydrogen/oil volume ratio is 7;

The cutting temperature of the light gasoline is 60° C., the cutting temperature of the medium and the heavy gasoline is 140° C.; that is, the fraction which is collected below 60° C. is the light gasoline fraction, the fraction which is collected between 60° C. and 140° C. is the medium gasoline fraction, the fraction which is collected higher than 140° C. is the heavy gasoline fraction;

The esterification reaction conditions of the light gasoline are: the pressure is 2.0 MPa, the temperature is 110° C., the liquid volume space velocity is 2.5 $h^{-1}$ (based on the acetic acid), and the weight ratio of the acetic acid and olefins in the light fraction gasoline is 1.2:1;

The number of column plates of the first rectifying column 201 is 30, the number of feed plates is 18, the operating conditions are controlled to be: the column top temperature is 29° C., the column top pressure is 1 atm, the column kettle temperature is 144° C., the column kettle pressure is 1.2 atm, the reflux ratio is 2;

The number of column plates of the second rectifying column 202 is 70, the number of feed plates is 14, the operating conditions are controlled to be: the column top temperature is 122° C., the column top pressure is 1 atm, the column kettle temperature is 162° C., the column kettle pressure is 1.5 atm, the reflux ratio is 10;

The number of column plates of the third rectifying column 203 is 36, the number of feed plates is 18, the operating conditions are controlled to be: the column top temperature is 88° C., the column top pressure is 1 atm, the column kettle temperature is 109° C., the column kettle pressure is 1.2 atm, the reflux ratio is 10; The number of column plates of the fourth rectifying column 204 is 40, the number of feed plates is 24, the operating conditions are controlled to be: the column top temperature is 96° C., the column top pressure is 1 atm, the column kettle temperature is 126° C., the column kettle pressure is 1.3 atm, and the reflux ratio is 8;

The number of column plates of the extractive distillation column 301 is 85, the number of feed plates is 52, the operating conditions are controlled to be: the column top temperature is 92° C., the column top pressure is 0.42 atm, the column kettle temperature is 175° C., the column kettle pressure is 1.25 atm, the reflux ratio is 0.6, the mass ratio of the extraction solvent and the medium gasoline fraction is 3.5:1;

The number of column plates of the desulfurization column 302 is 19, the number of feed plates is 3, the operating conditions are controlled to be: the column top temperature is 92° C., the column top pressure is −0.4 atm, the column kettle temperature is 175° C., the column kettle pressure is −0.4 atm, the reflux ratio is 0.6, the mass ratio of the kettle product solvent returned to the extractive distillation column 301 and that went to the regeneration column 303 is 130:1; The temperature of the regeneration column is controlled to be 154° C., mass ratio of the water vapor and the solvent is 7:4;

The esterification reaction conditions of the raffinate oil are: the pressure is 2.0 MPa, the temperature is 125° C., the liquid volume space velocity is 2.5 h$^{-1}$ (based on the formic acid), the weight ratio of the formic acid and olefins in the raffinate oil is 1.1:1, the mass ratio of the formic acid aqueous solution extract used for separation and purification and that used as the formic acid extractant is 1:90;

The debenzolization treatment is carried out using a debenzolization column 113: the number of column plates of the debenzolization column 113 is 30, the number of feed plates is 18, the operating conditions are controlled to be: the column top temperature is 103° C., the column top pressure is 1 atm, the column kettle temperature is 141° C., the column kettle pressure is 1.3 atm, the reflux ratio is 2.

As shown in FIG. 3, the heavy gasoline fraction is mixed with the extracted oil which has underwent debenzolization treatment, to obtain a mixed oil, the mixed oil is subjected to the operations in series, firstly, the mixed oil is contacted with an one-stage selective hydrodesulfurization catalyst in the one-stage hydrodesulfurization reactor 107 to perform an one-stage hydrodesulfurization reaction, the reaction conditions are: the pressure is 1.5 MPa, the temperature is 265° C., liquid volume space velocity is 3.5 h$^{-1}$, hydrogen/oil volume ratio is 300:1; then it contacts with a two-stage selective hydrodesulfurization catalyst in the two-stage hydrodesulfurization reactor 108 to perform a two-stage hydrodesulfurization reaction, the reaction conditions are: the pressure is 1.5 MPa, the temperature is 350° C., the liquid volume space velocity is 3.2 h$^{-1}$, the hydrogen/oil volume ratio is 300:1; then it enters the stripping column 109 to remove H$_2$S, the bottom temperature of the stripping column is controlled to be 175° C., the column top temperature is 75° C., the pressure is 0.5 MPa; finally, it contacts with a hydrocarbon isomerization/aromatization catalyst in the hydrocarbon isomerization/aromatization reaction 110, a hydrocarbon isomerization/aromatization reaction is performed, the reaction conditions are: the pressure is 1.5 MPa, the temperature is 360° C., the liquid volume space velocity is 1.5 h$^{-1}$, the hydrogen/oil volume ratio is 300:1.

After the completion of the reaction, the esterified light gasoline, the esterified medium gasoline and the treated heavy gasoline are blended to obtain an ultra-clean high-octane value gasoline. The properties and parameters of the gasoline are shown in table 3.

TABLE 3

The properties and parameters of the raw oil 2 and upgraded blended product of the light, medium and heavy gasoline in Example 3

| Item | Raw Oil 2 | The blended product of the light, medium and heavy gasoline |
|---|---|---|
| yield (wt %) | — | 99.5 |
| density (g/mL) | 0.733 | 0.732 |
| distillation range | 34-202 | 33-203 |
| content of typical hydrocarbons (v %) | | |
| aromatics | 20.3 | 24.1 |
| olefin | 42.3 | 14.6 |
| isoparaffin | 20.2 | 23.5 |
| benzene | 1.5 | 0.7 |
| sulfur (μg · g$^{-1}$) | 1230.0 | 9.4 |
| RON | 92.1 | 92.1 |

As can be seen from table 3, the modified method of this Example can reduce the sulfur content of FCC gasoline from 1230.0 μg·g$^{-1}$ to 9.4 μg·g$^{-1}$, and the olefin content reduces from 42.3 v % to 14.6 v %, the isoparaffin content increases from 20.2 v % to 23.5 v %, the aromatics content increases from 20.3 v % to 24.1 v %, the benzene content decreases from 1.5 v % to 0.7 v %, Meanwhile, the esterification of olefins in the light gasoline fraction and the medium gasoline raffinate oil, the hydrocarbon isomerization/aromatization of the heavy gasoline leads to the blended product without RON lost, the liquid yield of 99.5 wt % under the conditions of ultra-deep desulfurization and significant olefin reduction of the raw oil 2, and the blended product conforms to the requirement of National VI clean gasoline standard.

Example 4

The Example provides a method and a system for producing an ultra-clean high-octane gasoline which uses the aforementioned raw oil 2 as the raw material.

Figure 4:
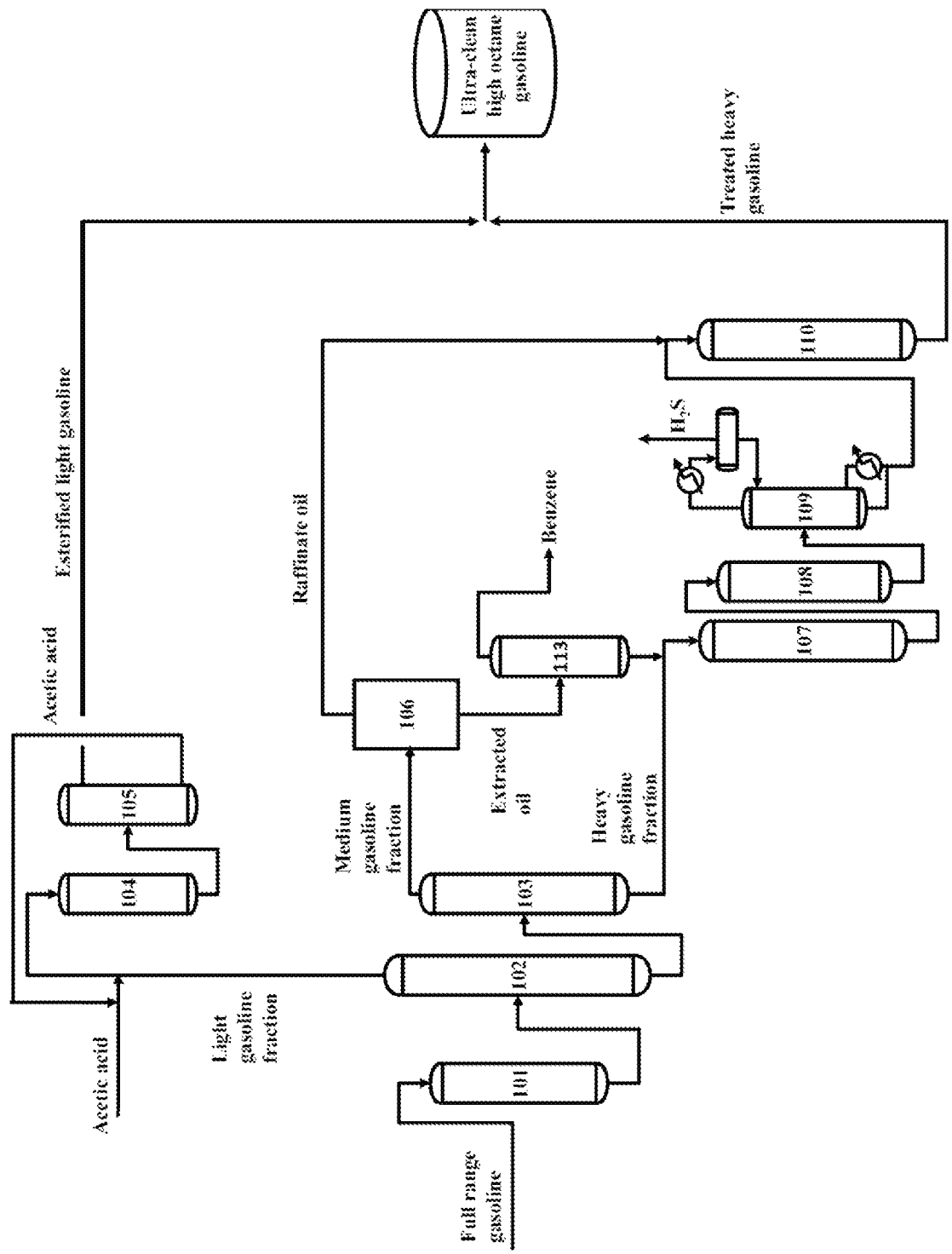
FIG. 4 is a schematic flow diagram and a system of a method for producing an ultra-clean high-octane gasoline provided in Example 4 of the present disclosure.

As shown in FIG. 4, the system of this Example is substantively same as Example 3, except that the raffinate oil outlet of the extractive distillation system 106 is not connected with the inlet of raw material of reaction of the medium gasoline esterification reactor 111, but directly connected on the inlet of raw material of reaction of the hydrocarbon isomerization/aromatization reactor 110 through a pipeline. That is, the medium gasoline esterification reactor 111, the formic acid extraction system and the coalescence dehydrator 112 are not included in this Example, the raffinate oil outlet of the extractive distillation system 106 is directly connected with the inlet of raw material of reaction of the hydrocarbon isomerization/aromatization reactor 110 through a pipeline, and the rest is the same as the aforementioned producing system.

The system of the Example is similar to that of Example 3, except that the process of the Example does not perform the esterification reaction of the raffinate oil in Example 3. Instead, the raffinate oil is mixed with the H$_2$S-removal product after the stripping column 109, together subjected to the hydrocarbon isomerization/aromatization reaction. The remaining preparation methods and composition of each catalyst, parameters of reaction devices, the reaction conditions are all the same as Example 3, and the properties and parameters of the obtained upgraded gasoline product are shown in Table 4.

TABLE 4

The properties and parameters of the upgraded blended product of the light, medium and heavy gasoline in Example 4

| Item | The blended product of the light, medium and heavy gasoline |
|---|---|
| yield (wt %) | 99.4 |
| density (g/mL) | 0.734 |
| distillation range | 33-202 |
| content of typical hydrocarbons (v %) | |
| aromatics | 25.4 |
| olefin | 14.9 |
| isoparaffin | 27.3 |
| benzene | 0.7 |
| sulfur ($\mu g \cdot g^{-1}$) | 9.4 |
| RON | 92.2 |

As can be seen from table 4, the modified method of this Example can reduce the sulfur content of FCC gasoline from 1230.0 $\mu g \cdot g^{-1}$ to 9.4 $\mu g \cdot g^{-1}$, and the olefin content reduces from 42.3 v % to 14.9 v %, the isoparaffin content increases from 20.2 v % to 27.3 v %, the aromatics content increases from 20.3 v % to 25.4 v %, the benzene content decreases from 1.5 v % to 0.7 v %. Meanwhile the esterification of olefins in the light gasoline fraction, the hydrocarbon isomerization/aromatization of the medium gasoline raffinate oil and the heavy gasoline leads to RON of the blended product increasing by 0.1 unit, the liquid yield of 99.4 wt % under the conditions of ultra-deep desulfurization and significant olefin reduction of the raw oil 2, and the product conforms to the requirement of National VI clean gasoline standard.

The above four Examples show that the method for producing an ultra-clean high-octane gasoline provided by the disclosure can upgrade the raw material gasoline with high sulfur and high olefin to the National VI clean gasoline products with sulfur content ≤10 $\mu g \cdot g^{-1}$, olefin content ≤15 v %, benzene content ≤0.8 v %, and the octane value is not lost or improved in the gasoline research, indicating that the method of the disclosure has a good hydrogenation effect on inferior gasolines.

The above specific Examples further described the objects, technical solutions and advantageous effects of the present disclosure, but is not intended to limit the scope of the disclosure.

What is claimed is:
1. A method for producing a clean gasoline, comprising the steps of:
allowing a full range gasoline to be contacted with a sulfur-transfer catalyst in the presence of hydrogen and undergo a directional sulfur transfer reaction, and then cutting the gasoline to obtain a light gasoline fraction, a medium gasoline fraction and a heavy gasoline fraction, in which the gasoline is cut into the light gasoline fraction and the heavy component firstly, and then the heavy component is cut into a medium gasoline fraction and a heavy gasoline fraction;
mixing the light gasoline fraction with acetic acid, wherein the olefins in the light gasoline fraction are subjected to an esterification reaction under the action of a light gasoline esterification catalyst, and then removing the unreacted acetic acid to obtain an esterified light gasoline;
obtaining an olefin-rich raffinate oil and a sulfide- and aromatics-rich extracted oil by separating the medium gasoline fraction by passing the medium gasoline fraction through an extractive distillation system;
mixing the raffinate oil with formic acid, wherein the olefins in the raffinate oil are subjected to an esterification reaction under the action of the medium gasoline esterification catalyst, and then the unreacted formic acid is removed to obtain an esterified medium gasoline;
mixing the heavy gasoline fraction with the extracted oil to obtain a mixed gasoline, which is successively subjected to a one-stage hydrodesulfurization reaction, a two-stage hydrodesulfurization reaction and $H_2S$-removal, and a hydrocarbon isomerization/aromatization reaction to obtain a treated heavy gasoline; and
re-blending the esterified light gasoline, the esterified medium gasoline and the treated heavy gasoline to obtain the clean gasoline,
wherein the one-stage hydrodesulfurization reaction occurs under the condition that the mixed gasoline is contacted with a one-stage selective hydrodesulfurization catalyst to remove the macromolecular sulfides;
wherein the two-stage hydrodesulfurization reaction occurs under the condition that the product of the one-stage hydrodesulfurization reaction is contacted with a two-stage selective hydrodesulfurization catalyst to remove the small molecular sulfides;
wherein the hydrocarbon isomerization/aromatization reaction occurs under the condition that the product of $H_2S$-romoval is contacted with a hydrocarbon isomerization/aromatization catalyst;
wherein the full range gasoline is a full range FCC gasoline having a sulfur content of 300 to 2000 $\mu g \cdot g^{-1}$, and an olefin content of 25 to 50 v %;
wherein the reaction conditions of the directional sulfur transfer reaction are: a reaction pressure of 1.0 to 3.0 MPa, a liquid volume space velocity of 2.0 to 8.0 $h^{-1}$, a reaction temperature of 100° C. to 200° C., a hydrogen/oil volume ratio 4 to 50;
wherein the cutting temperature between the light gasoline fraction and the medium gasoline fraction is any point in the range of 30° C. to 60° C., and the cutting temperature between the medium gasoline fraction and the heavy gasoline fraction is higher than any point in the range of 60° C. to 150° C.;
wherein the light gasoline esterification catalyst or the medium gasoline esterification catalyst includes one or more of a metal oxide catalyst, a zeolite molecular sieve catalyst, a $SO_4^{2-}/M_xO_y$ catalyst, a strong acid cation exchange resin catalyst, or a mixture thereof, wherein in $M_xO_y$, x is 1 to 5, y is 1 to 8; and
wherein the two-stage selective hydrodesulfurization catalyst comprises: $MoO_3$ 3 to 10 wt. %, NiO 5 to 20 wt. %, $K_2O$ 1 to 7 wt. % and the balance being Al—Si composite oxide carrier, based on 100% of the total weight of the two-stage selective hydrodesulfurization catalyst, and the weight composition of the Al—Si composite oxide in the catalyst is: $Al_2O_3$ 60 to 75 wt. %, $SiO_2$ 5 to 15 wt. %.

2. The method for producing a clean gasoline according to claim 1, wherein the raffinate oil is not subjected to an esterification reaction, but the raffinate oil is directly mixed with the product after removing the $H_2S$ to carry out the hydrocarbon isomerization/aromatization reaction.

3. The method for producing a clean gasoline according to claim 1, wherein the extracted oil is subjected to a debenzolization treatment prior to mixing with the heavy gasoline fraction and the debenzolization treatment is carried out on the extracted oil using a debenzolization rectification system;

wherein the debenzolization rectification system comprises a debenzolization column, the number of column plates of the debenzolization column is 20 to 50, the number of feed plates is 10 to 40, the operating conditions are controlled to be: the column top temperature is 90 to 120° C., the column top pressure is 0.7 to 1.5 atm, the column kettle temperature is 120 to 160° C., the column kettle pressure is 1.3 to 1.7 atm, the reflux ratio is 1.5 to 2.5.

4. The method for producing a clean gasoline according to claim 1, wherein the extractive distillation system comprises an extractive distillation column, a desulfurization column, an extraction oil dehydrator and a regeneration column, and wherein the step of obtaining an olefin-rich raffinate oil and a sulphide-, aromatic-rich extracted oil by separating the medium gasoline fraction by passing through the extractive distillation system comprises:

passing the medium gasoline fraction into the extractive distillation column, and sufficiently contacting the medium gasoline fraction with the extraction solvent injected from the top of the extractive distillation column so that the raffinate oil as the top product and the mixture of the extracted oil and the solvents as the bottom product are obtained through rectification separation, wherein a part of the raffinate oil as the top product is reflux and a part of the raffinate oil is used as the product of this step, and wherein the mixture of the extracted oil and the solvents as the bottom product is sent into the desulfurization column for rectification;

wherein water vapor and a regenerated solvent from the regeneration column is into the bottom of the desulfurization column, a mixture of the extracted oil and water as the top product and the solvent as the bottom product are obtained by the rectification separation, the mixture of the extracted oil and water is layered to obtain a pre-dehydration extracted oil and water, a part of the pre-dehydration extracted oil is reflux, a part of the pre-dehydration extracted oil is dehydrated by a extraction oil dehydrator to obtain an extracted oil, the extracted oil is the product of this step, a part of the solvent obtained at the bottom is returned to the extractive distillation column as the extraction solvent, and a part of the solvent obtained is sent into the regeneration column for solvent regeneration; and wherein water vapor is introduced into the bottom of the regeneration column and used to strip the entering solvent to obtain the water vapor and a regenerated solvent and a deactivated solvent, the water vapor and the regenerated solvent are discharged from the top of the regeneration column and returned to bottom of the desulfurization column, and the deactivated solvent is discharged from the bottom of the regeneration column.

5. The method for producing a clean gasoline according to claim 1, wherein the step of subjecting the olefin in the raffinate oil to an esterification reaction and then removing the unreacted formic acid to obtain an esterified medium gasoline comprises the following steps:

mixing the raffinate oil with formic acid, and adding the mixture into the medium gasoline esterification reactor, and by contacting with a medium gasoline esterification catalyst, the olefins in the raffinate oil are esterified to obtain an esterified product; and removing the formic acid in the esterified product by an extraction operation and then the resultant being dehydrated to obtain an esterified medium gasoline.

6. The method for producing a clean gasoline according to claim 4, wherein the extraction solvent includes one or more of diethylene glycol, triethylene glycol, tetraethylene glycol, dimethyl sulfoxide, sulfolane, N-formyl morpholine, N-methyl-pyrrolidone, polyethylene glycol and propylene carbonate.

7. The method for producing a clean gasoline according to claim 4, wherein the number of column plates of the extractive distillation column is 50 to 100, the number of feed plates is 30 to 70, the operating conditions are controlled to be: the column top temperature is 60 to 110° C., the column top pressure is 0.1 to 1 atm, the column kettle temperature is 140 to 200° C., the column kettle pressure is 0.5 to 1.5 atm, the reflux ratio is 0.1 to 3, the mass ratio of the extraction solvent and the medium gasoline fraction is 1 to 10:1;

wherein the number of column plates of the desulfurization column is 15 to 35, the number of feed plates is 1 to 20, the operating conditions are controlled to be: the column top temperature is 40 to 80° C., the column top pressure is −1 to 0 atm, the column kettle temperature is 140 to 200° C., the column kettle pressure is −1 to 0 atm, the reflux ratio is 0.1 to 3; and wherein the extraction oil dehydrator is a coalescence dehydrator.

8. The method for producing a clean gasoline according to claim 4, wherein the top temperature of the regeneration column is 100 to 200° C., the mass ratio of the introduced water vapor to the entering solvent is 0.5 to 5:1.

9. The method for producing a clean gasoline according to claim 5, wherein the esterified product is mixed with the formic acid extractant water and/or formic acid aqueous solution, the mixture is stirred and layered to obtain an aqueous esterified medium gasoline and a formic acid aqueous solution extract, and the aqueous esterified medium gasoline after dehydration becomes an esterified medium gasoline.

10. The method for producing a clean gasoline according to claim 5, wherein the esterification reaction conditions of the raffinate oil are: the reaction temperature is 80 to 200° C., the reaction pressure is 0.1 to 6.0 MPa, the weight ratio of the formic acid and the olefins in the raffinate oil is 0.5 to 2.5:1.0, and the liquid volume space velocity is 0.5 to 5.0 h$^{-1}$ based on the formic acid.

11. The method for producing a clean gasoline according to claim 5, wherein the aqueous esterified medium gasoline is dehydrated by a coalescence dehydrator.

12. The method for producing a clean gasoline according to claim 1, wherein the metal oxide catalyst comprises a catalyst made of at least one of silica, a molecular sieve and diatomite as a carrier loaded with at least one metal oxide of ZnO, SnO and $Al_2O_3$, wherein the carrier may have a microporous structure or a mesoporous structure.

13. The method for producing a clean gasoline according to claim 1, wherein the zeolite molecular sieve catalyst comprises a molecular sieve catalyst mixed from one or more of an aluminum phosphate molecular sieve, a silicoaluminophosphate molecular sieve, a H-type mordenite, a HY zeolite, a H-β zeolite, a HZSM-5 zeolite and a silicon-containing alumina, and the zeolite molecular sieve is a micropore zeolite molecular sieve or a cascade pore zeolite molecular sieve.

14. The method for producing a clean gasoline according to claim 1, wherein the $SO_4^{2-}/M_xO_y$ catalyst may include a $SO_4^{2-}/M_xO_y$ catalyst prepared by loading $SO_4^{2-}$ onto a carrier made of at least one metal oxide of ZrO, ZnO and SnO.

15. The method for producing a clean gasoline according to claim 1, wherein the strong acid cation exchange resin catalyst includes a mesoporous-macroporous cross-linked polymer catalyst comprising a strong acid reactive group.

* * * * *